United States Patent
Sawabe et al.

(10) Patent No.: US 11,956,397 B2
(45) Date of Patent: Apr. 9, 2024

(54) IMAGE READING DEVICE

(71) Applicant: Mitsubishi Electric Corporation, Tokyo (JP)

(72) Inventors: Toshiyuki Sawabe, Tokyo (JP); Kosaku Yamagata, Tokyo (JP); Hironobu Arimoto, Tokyo (JP); Sadaaki Yoshioka, Tokyo (JP); Takashi Maekawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/914,359

(22) PCT Filed: Mar. 26, 2021

(86) PCT No.: PCT/JP2021/012971
§ 371 (c)(1),
(2) Date: Sep. 26, 2022

(87) PCT Pub. No.: WO2021/193945
PCT Pub. Date: Sep. 30, 2021

(65) Prior Publication Data
US 2023/0108017 A1  Apr. 6, 2023

(30) Foreign Application Priority Data

Mar. 27, 2020  (JP) ................................. 2020-057277
Aug. 20, 2020  (JP) ................................. 2020-139500

(51) Int. Cl.
*H04N 1/04* (2006.01)
*G02B 13/24* (2006.01)
(Continued)

(52) U.S. Cl.
CPC ........... *H04N 1/0306* (2013.01); *G02B 13/24* (2013.01); *H04N 1/00562* (2013.01); *H04N 1/0289* (2013.01)

(58) Field of Classification Search
None
See application file for complete search history.

(56) References Cited

U.S. PATENT DOCUMENTS 11,196,889 B2 *  12/2021  Sawada ................... G02B 6/001
2001/0028506 A1  10/2001  Fujimoto et al.
(Continued)

FOREIGN PATENT DOCUMENTS

JP  2001-352429 A  12/2001
JP  2003-163938 A  6/2003
(Continued)

OTHER PUBLICATIONS

International Search Report and Written Opinion dated Jun. 8, 2021, received for PCT Application PCT/JP2021/012971, filed on Mar. 26, 2021, 8 pages including English Translation.
(Continued)

*Primary Examiner* — Cheukfan Lee
(74) *Attorney, Agent, or Firm* — XSENSUS LLP

(57) ABSTRACT

An image reading device includes a lens array including lenses arranged in a main scanning direction and forming an erect unmagnified optical system to converge light from a reading target, a holder holding the lens array, a light receiver to receive the light converged by the lenses, and slit units. Each slit unit includes three or more light shielding plates each separating an optical path of one lens from an optical path of another lens between the lens array and the light receiver, and side plates disposed on two sides of the light shielding plates in a direction intersecting the main scanning direction and connecting two adjacent light shield- (Continued)

ing plates. The slit units are arranged in the main scanning direction, and each two adjacent slit units are arranged with a space therebetween for one optical path of one lens.

20 Claims, 37 Drawing Sheets

(51) Int. Cl.
*H04N 1/00* (2006.01)
*H04N 1/028* (2006.01)
*H04N 1/03* (2006.01)

(56) References Cited

U.S. PATENT DOCUMENTS

| | | |
|---|---|---|
| 2009/0009876 A1 | 1/2009 | Nomura et al. |
| 2011/0043872 A1 | 2/2011 | Mamada et al. |
| 2017/0346987 A1* | 11/2017 | Ouchi ................ H04N 1/40056 |
| 2018/0035001 A1* | 2/2018 | Murase ................ H04N 1/1903 |
| 2018/0152581 A1* | 5/2018 | Murase ................ H04N 1/0305 |
| 2019/0045073 A1* | 2/2019 | Murase ............. H04N 1/19547 |
| 2019/0222711 A1* | 7/2019 | Kobayashi ......... G02B 17/0621 |

FOREIGN PATENT DOCUMENTS

| | | |
|---|---|---|
| JP | 2009-37199 A | 2/2009 |
| JP | 2011-43643 A | 3/2011 |
| JP | 2012-217128 A | 11/2012 |

OTHER PUBLICATIONS

Notice of Reasons for Refusal dated Sep. 7, 2021, received for JP Application 2021-548640, 6 pages Including English Translation.
Decision to Grant dated Nov. 9, 2021, received for JP Application 2021-548640, 5 pages including English Translation.

* cited by examiner

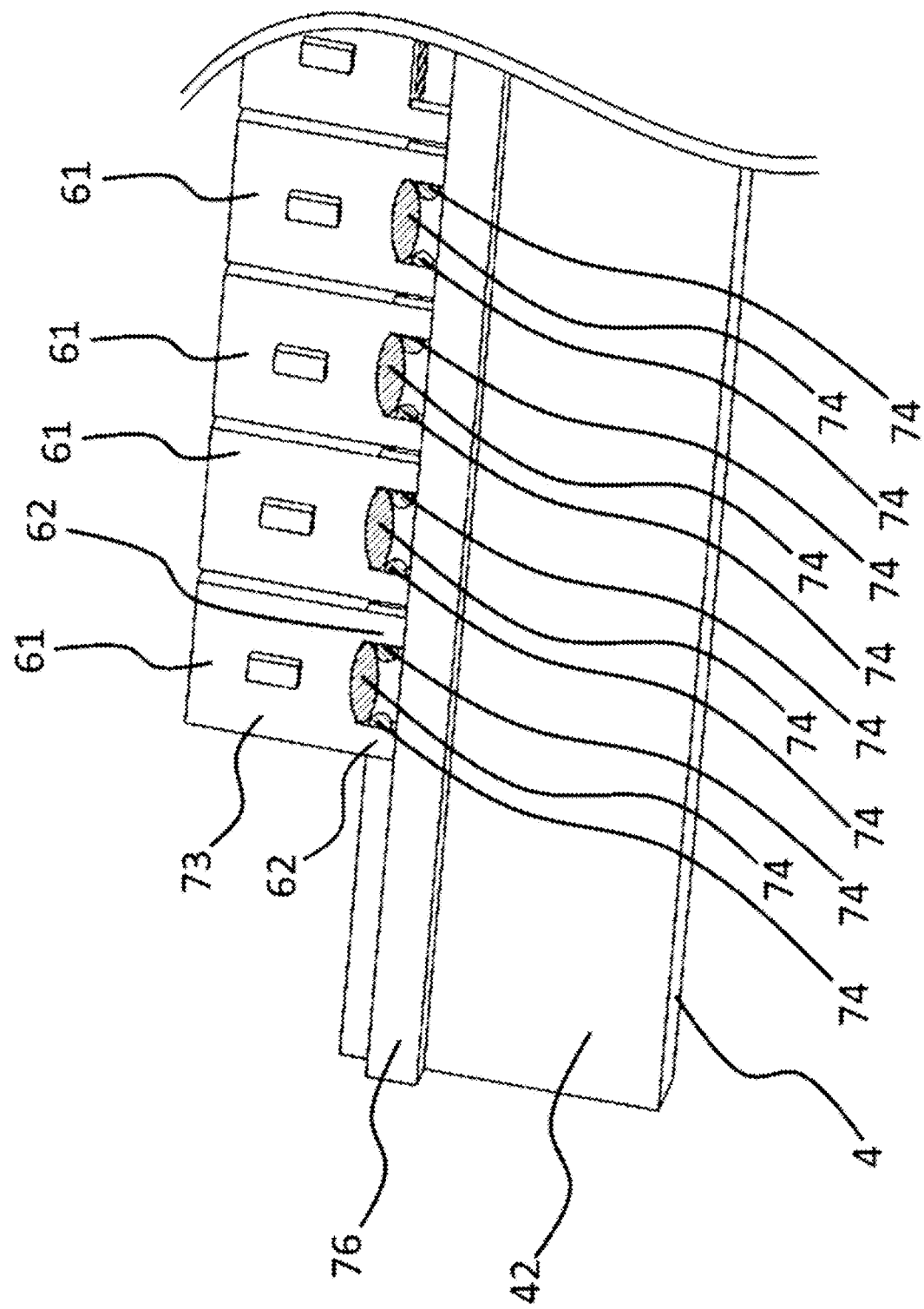

IMAGE READING DEVICE

CROSS-REFERENCE TO RELATED APPLICATIONS

The present application is based on PCT filing PCT/JP2021/012971, filed Mar. 26, 2021, which claims priority to JP 2020-057277, filed Mar. 27, 2020 and JP 2020-139500, filed Aug. 20, 2020, the entire contents of each are incorporated herein by reference.

TECHNICAL FIELD

The present disclosure relates to an image reading device included particularly in, for example, a facsimile, a copying machine, a scanner, or a surface inspector.

BACKGROUND ART

Known image reading devices converge light transmitted through or reflected by a reading target (illumination target) with a lens array including an array of lenses, and read the light with a sensor integrated circuit (IC) to acquire electronic information representing, for example, images, characters, and patterns on the reading target. Some of such image reading devices include slit members (light shields) each having multiple through-holes in front of the lens surfaces (see, for example, Patent Literature 1).

In Patent Literature 1, the through-holes in each slit member (light shield) correspond to the individual lenses to restrict the optical paths of light from the respective lenses. Additionally, the multiple slit members are continuous in a main scanning direction of the lenses and attached to the lens array to at least partially overlap each other in a thickness direction at the joints between the slit members. This structure including the multiple separate slit members (light shields) allows each slit member to be shorter than when a single slit member is used. This reduces, for example, warpage or deformation of the slit members (light shields).

CITATION LIST

Patent Literature

Patent Literature 1: Unexamined Japanese Patent Application Publication No. 2001-352429

SUMMARY OF INVENTION

Technical Problem

However, in Patent Literature 1, the slit members (light shields) at least partially overlap each other in the thickness direction at their joints. Light-shielding walls at the overlaps then produce stray light and cause more flares.

In response to the above issue, an objective of the present disclosure is to provide an image reading device including a lens array including lenses arranged in a main scanning direction and multiple slit members arranged on the lens array in the main scanning direction to reduce flares at the joints between the slit members.

Solution to Problem

An image reading device according to an aspect of the present disclosure includes a lens array including a plurality of lenses arranged in a main scanning direction and forming an erect unmagnified optical system to converge light from a reading target, a holder extending in the main scanning direction and holding the lens array on two sides of the lens array in a direction intersecting the main scanning direction, a light receiver to receive the light converged by the plurality of lenses, and a plurality of slit units. Each of the plurality of slit units includes side plates and three or more light shielding plates. Each of the three or more light shielding plates separates an optical path of one of the plurality of lenses from an optical path of another of the plurality of lenses between the lens array and the light receiver. The side plates are disposed on two sides of the three or more light shielding plates in the direction intersecting the main scanning direction and connecting the three or more light shielding plates by connecting adjacent light shielding plates. The plurality of slit units are arranged in the main scanning direction, and each two adjacent slit units are arranged with a space therebetween for one optical path of one lens.

Advantageous Effects of Invention

The image reading device according to the above aspect of the present disclosure includes a lens array including lenses arranged in a main scanning direction and multiple slit members arranged on the lens array in the main scanning direction such that each two slit members are arranged with a space therebetween. This configuration reduces flares at the joints between the slit members.

BRIEF DESCRIPTION OF DRAWINGS

FIG. 38 is an enlarged view of the slit units and the lens array in the image reading device according to Embodiment 7 showing a surface with a reference plate.

DESCRIPTION OF EMBODIMENTS

Embodiment 1

Figure 1:
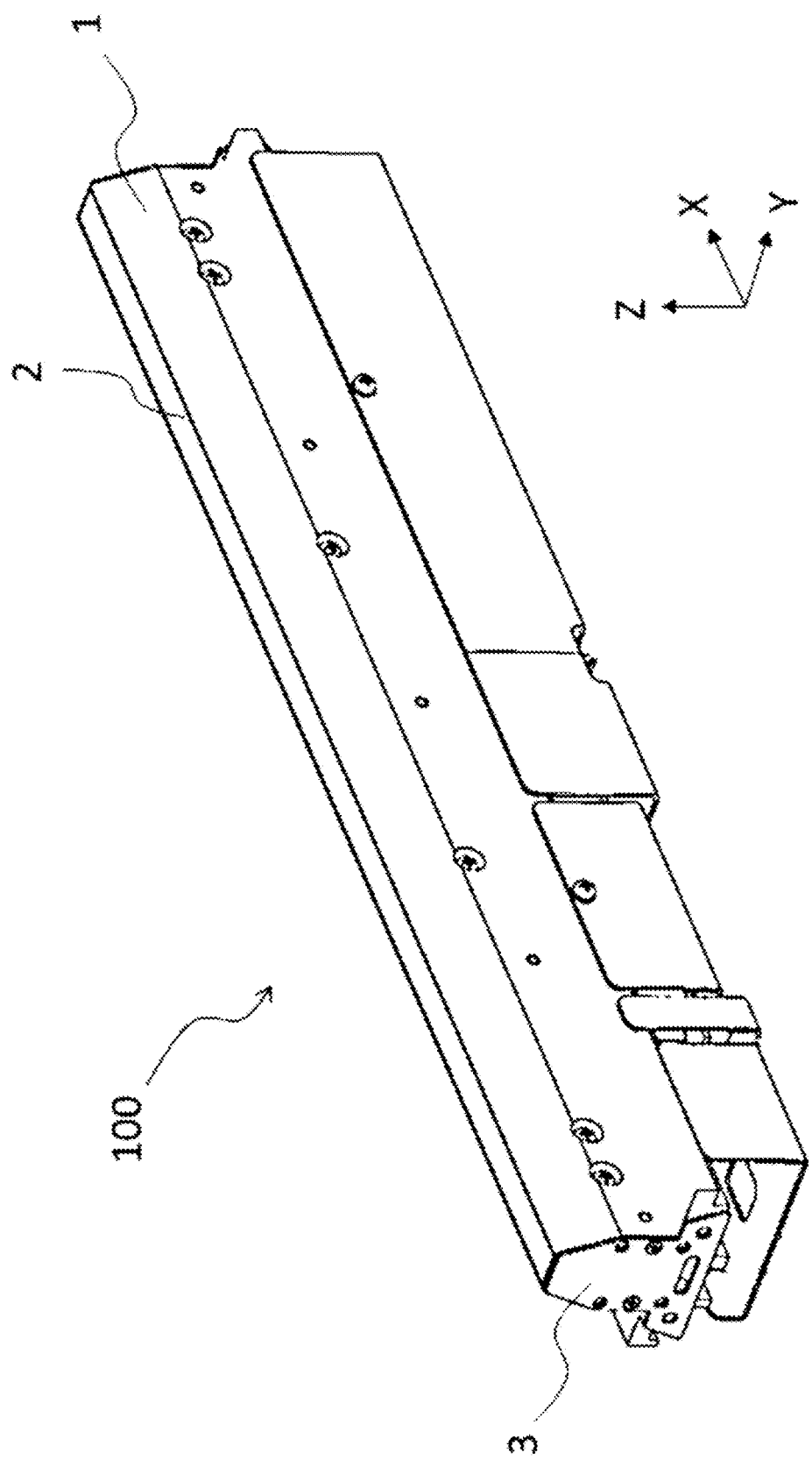
FIG. 1 is a perspective view of an image reading device according to Embodiment 1.
Figure 2:
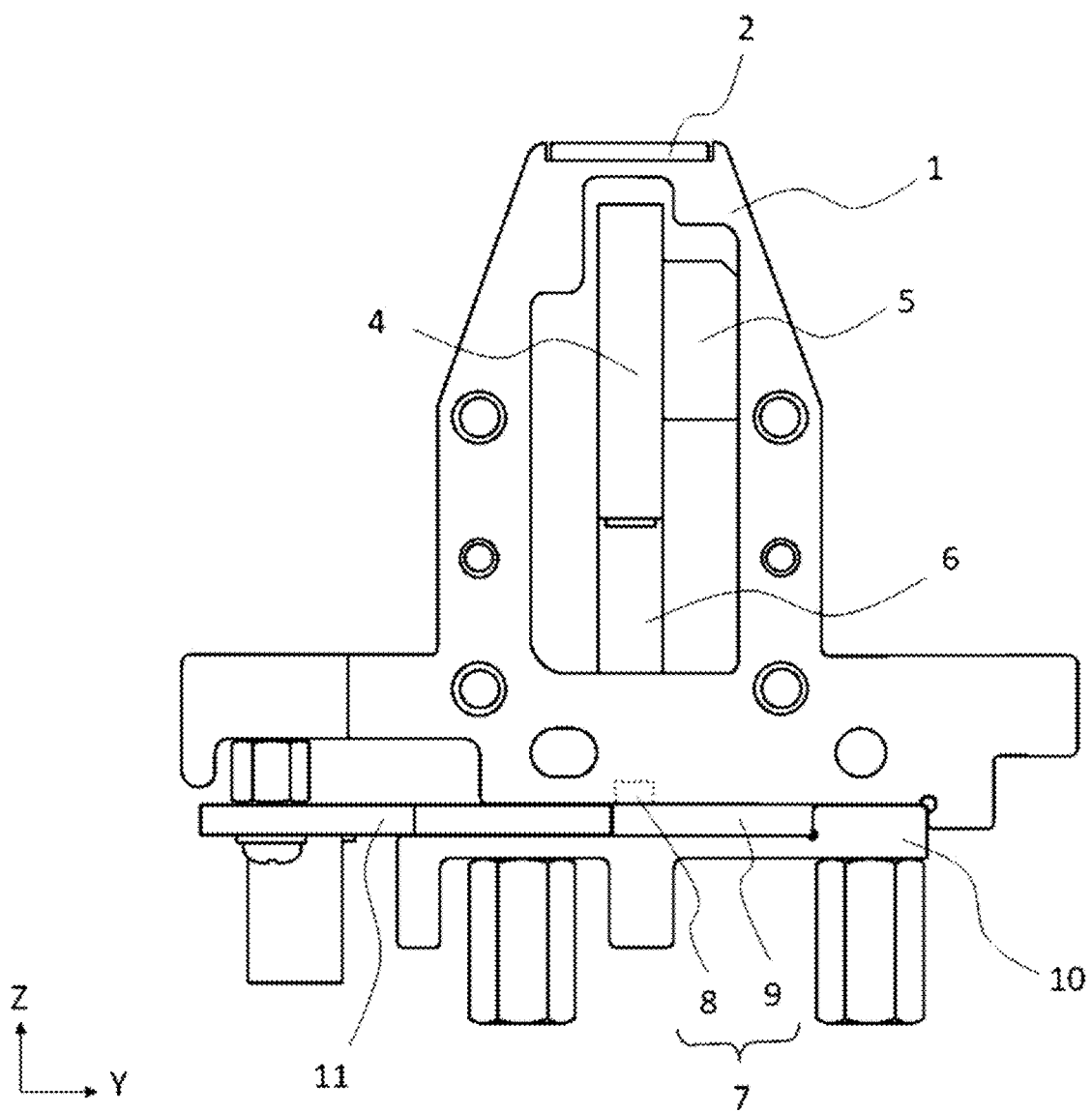
FIG. 2 is a side view of the image reading device according to Embodiment 1 from which a frame side plate is removed, as viewed in a main scanning direction.

An image reading device 100 according to Embodiment 1 is described below with reference to the drawings. In the drawings, the same reference signs denote the same or corresponding components, and such components are not described in detail. In the drawings, X, Y, and Z indicate the coordinate axes. The X-direction indicates a main scanning direction (longitudinal direction), the Y-direction indicates a sub-scanning direction (lateral direction), and the Z-direction indicates a read depth direction. FIG. 1 is a perspective view of the image reading device 100 according to Embodiment 1. FIG. 2 is a side view of the image reading device 100 according to Embodiment 1 from which a frame side plate is removed, as viewed in the main scanning direction.

As shown in FIGS. 1 and 2, the image reading device 100 according to Embodiment 1 includes a frame 1, a transparent plate 2, a frame side plate 3, a lens array 4, holders 42 that hold the lens array 4, a retainer plate 5, slit units 6, and a light receiver 7. The image reading device 100 reads image information about a reading target. Examples of the reading target include a target read medium (irradiation target) carrying image information about paper money, securities, or other common documents.

The frame 1 is rectangular-shaped with a longitudinal direction thereof being the main scanning direction and includes a rectangular opening adjacent to a reading target. The lateral direction of the frame 1 corresponds to a sub-scanning direction (direction in which the reading target is transported). The frame 1 is formed from a metal such as aluminum or a resin. The frame 1 accommodates or holds the lens array 4, the holders 42, the light receiver 7, and the slit units 6.

The transparent plate 2 closes the opening in the frame 1. The transparent plate 2 is formed from transparent glass or a transparent resin. The transparent plate 2 has flat two surfaces extending in the main scanning direction. A surface of the transparent plate 2 opposite to the surface facing the frame 1 serves as a reading surface for reading the reading target. The reading surface restricts the position at which the reading target is read.

Figure 3:
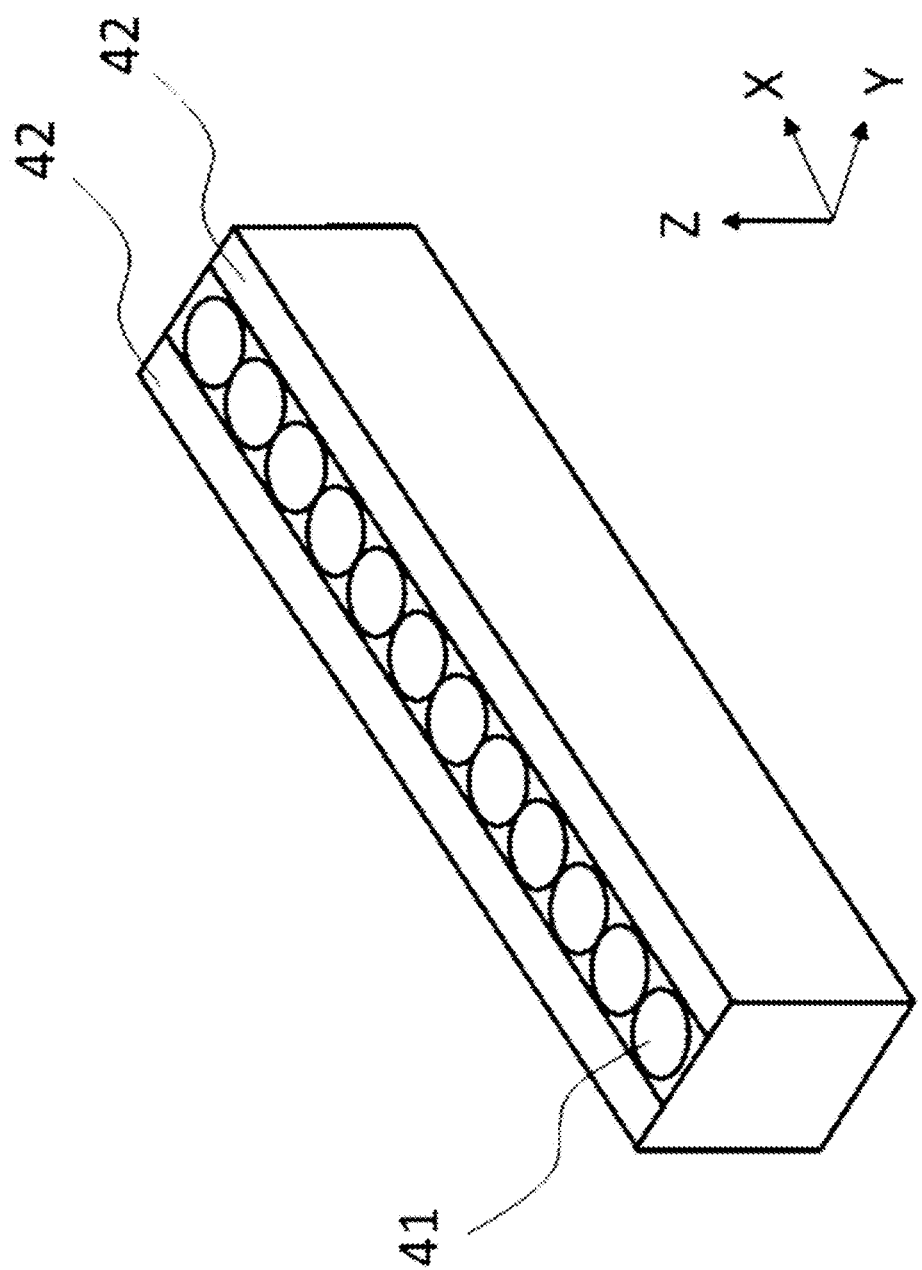
FIG. 3 is a perspective view of a lens array in the image reading device according to Embodiment 1.
Figure 4:
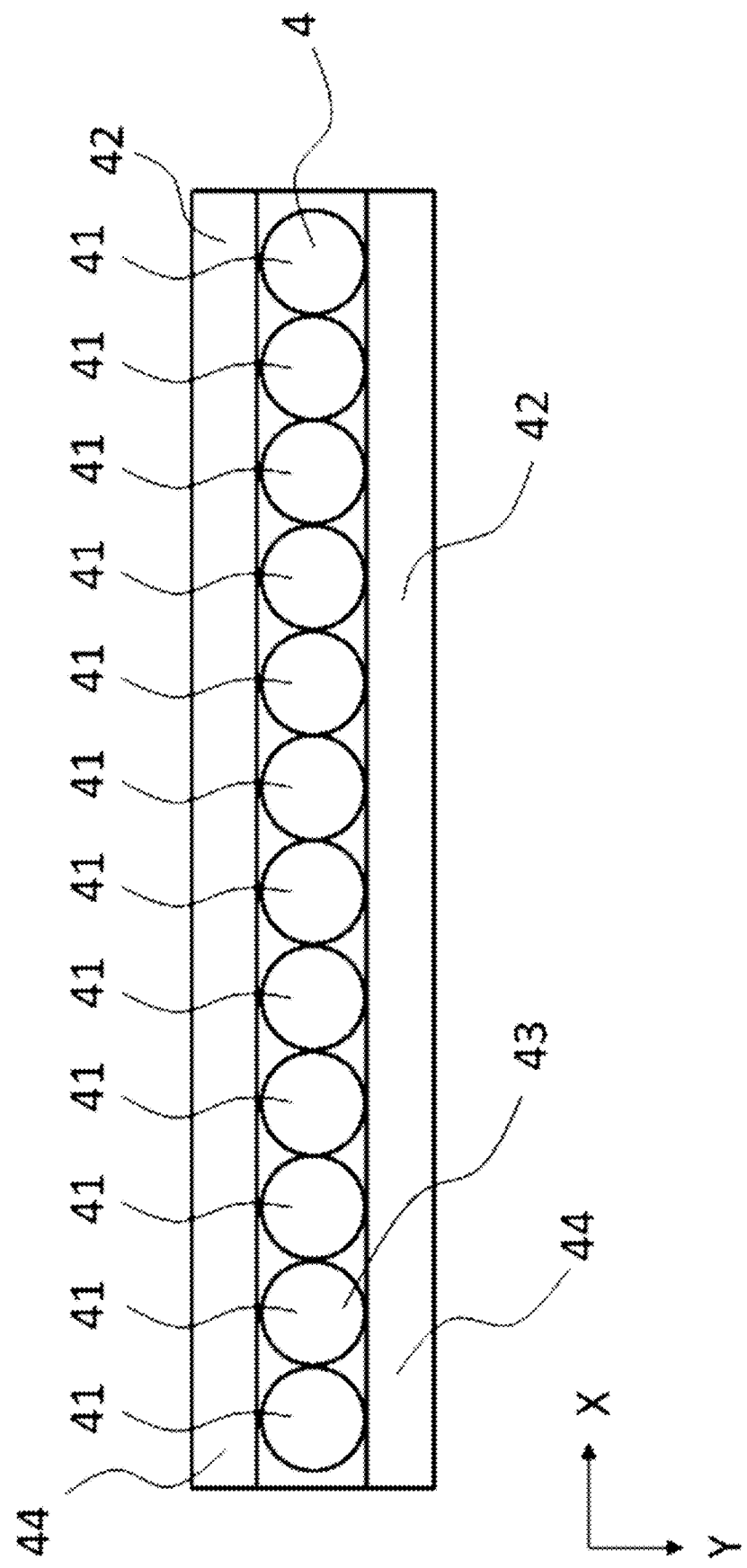
FIG. 4 is a top view of the lens array in the image reading device according to Embodiment 1 as viewed in a read depth direction.

FIG. 3 is a perspective view of the lens array 4 and the holders 42. FIG. 4 is a top view of the lens array 4 and the holders 42 as viewed in the read depth direction. The lens array 4 and the holders 42 are disposed between the reading target and the light receiver 7. The lens array 4 is bonded to the retainer plate 5 with an adhesive or tape with a holder 42 between the lens array 4 and the retainer plate 5. The retainer plate 5 bonded to the holders 42 is fastened to the frame 1 with a fastener such as a screw. The slit units 6 are connected to the surfaces of the holders 42 facing the light receiver 7.

The lens array 4 includes multiple lenses 41 arranged in the main scanning direction. Each lens 41 is a lens for an erect unmagnified optical system to converge light from the reading target. The holders 42 extend in the main scanning direction on both sides of the lens array 4 in a direction intersecting the main scanning direction. The holders 42 are formed from, for example, a resin. In this example, the holders 42 are plates to hold the lens array 4 on both sides in the direction intersecting the main scanning direction. In other words, the lens array 4 includes the lenses 41 that are tightly arranged in a line in the main scanning direction with no gap and is fixed with the holders 42 that are formed from, for example, a resin.

A light incidence surface 43 of the lens array 4 facing the reading target and light incidence surfaces 44 of the holders 42 facing the reading target are precisely ground and are flush with each other. Similarly, a light emission surface 45 of the lens array 4 facing the light receiver 7 and light emission surfaces 46 of the holders 42 facing the light receiver 7 are precisely ground and are flush with each other. The slit units 6 are connected to the surfaces of the holders 42 facing the light receiver 7.

The lens array 4 forms an erect unmagnified image of a reading target on sensor ICs 8. In this example, the lens array 4 is a rod lens array. The lens array 4 may be a microlens array. The lens array 4 may thus be a lens array for an erect unmagnified optical system. The lens array 4 has the optical axes perpendicular to the reading surface. The lens array 4 converges the light emitted from an illuminator, reflected by or transmitted through a reading target, and transmitted through the transparent plate 2, and forms an image on the light receiver 7.

The light receiver 7 receives light converged by the lenses 41. As shown in FIG. 2, the light receiver 7 includes a sensor substrate 9, the sensor ICs 8 mounted on the sensor substrate 9, and a driving circuit and other components mounted on the sensor substrate 9. The sensor ICs 8 are arrayed in accordance with the arrangement in the lens array 4. The sensor ICs 8 receive light converged by the lenses 41, and convert the light into electric signals through photoelectric conversion. The sensor ICs 8 are bonded to the sensor substrate 9 with, for example, an adhesive.

The sensor substrate 9 is formed from a resin such as glass epoxy, and receives the sensor ICs 8. The sensor substrate 9 is fixed to a board support plate 10 with, for example, tape, an adhesive, or a screw, together with a board 11 having a different function. The sensor substrate 9 is fixed to a surface of the board support plate 10 facing the reading target. In this example, the optical axis of each lens 41 is aligned with a light receiver such as a semiconductor chip mounted on the corresponding sensor IC 8.

The board support plate 10 is fixed to the frame 1 with, for example, tape, an adhesive, or a screw. The board support plate 10 and the frame 1 are formed from a material that blocks external light, and seal the sensor ICs 8. Thus, the board support plate 10 and the frame 1 block the light incident on the sensor ICs 8 from outside the image reading device 100 and prevent foreign matter such as dust from entering the image reading device 100.

Figure 5:
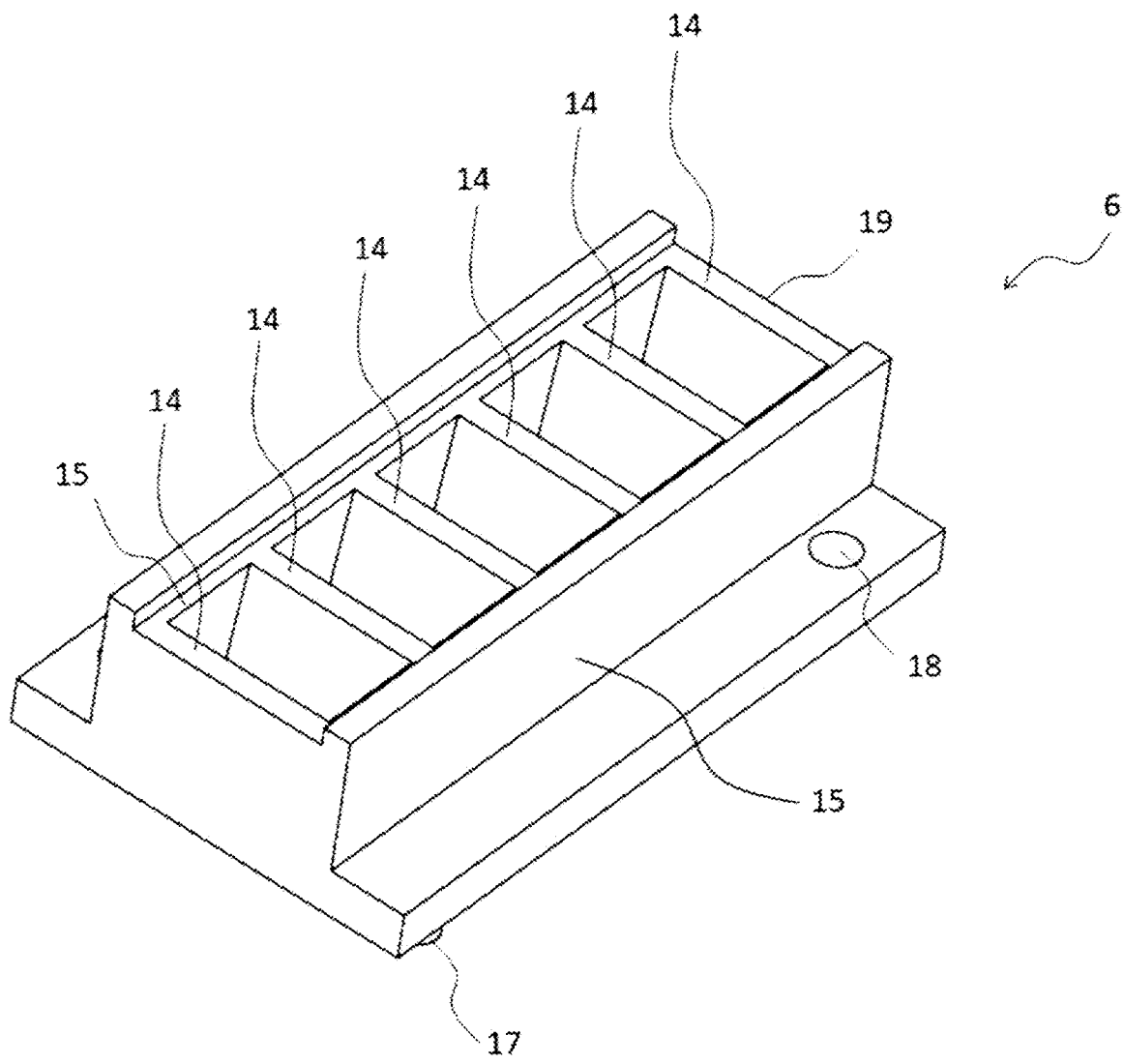
FIG. 5 is a perspective view of a slit unit in the image reading device according to Embodiment 1.
Figure 6:
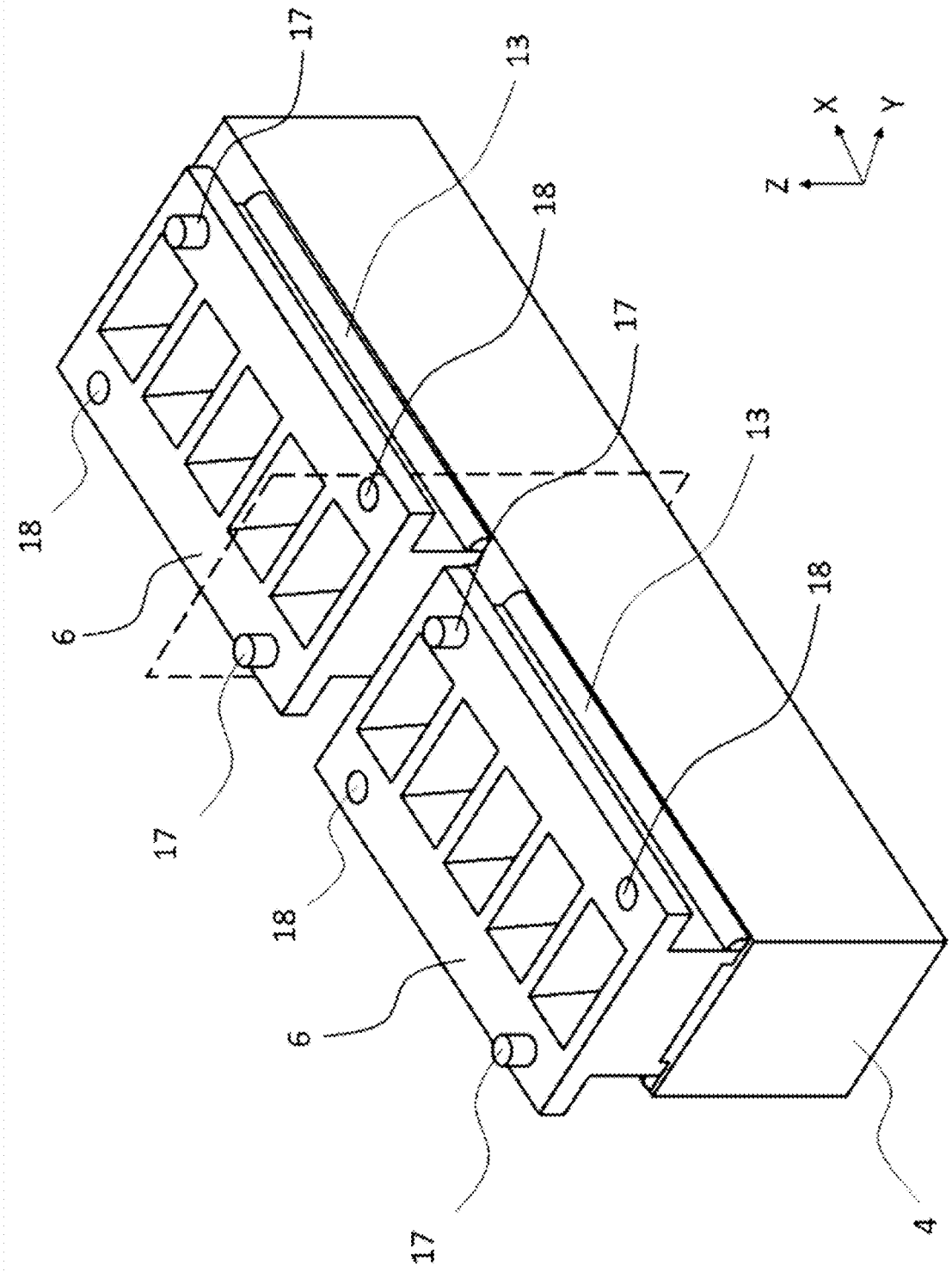
FIG. 6 is a perspective view of the lens array in the image reading device according to Embodiment 1 on which the slit units are disposed.
Figure 7:
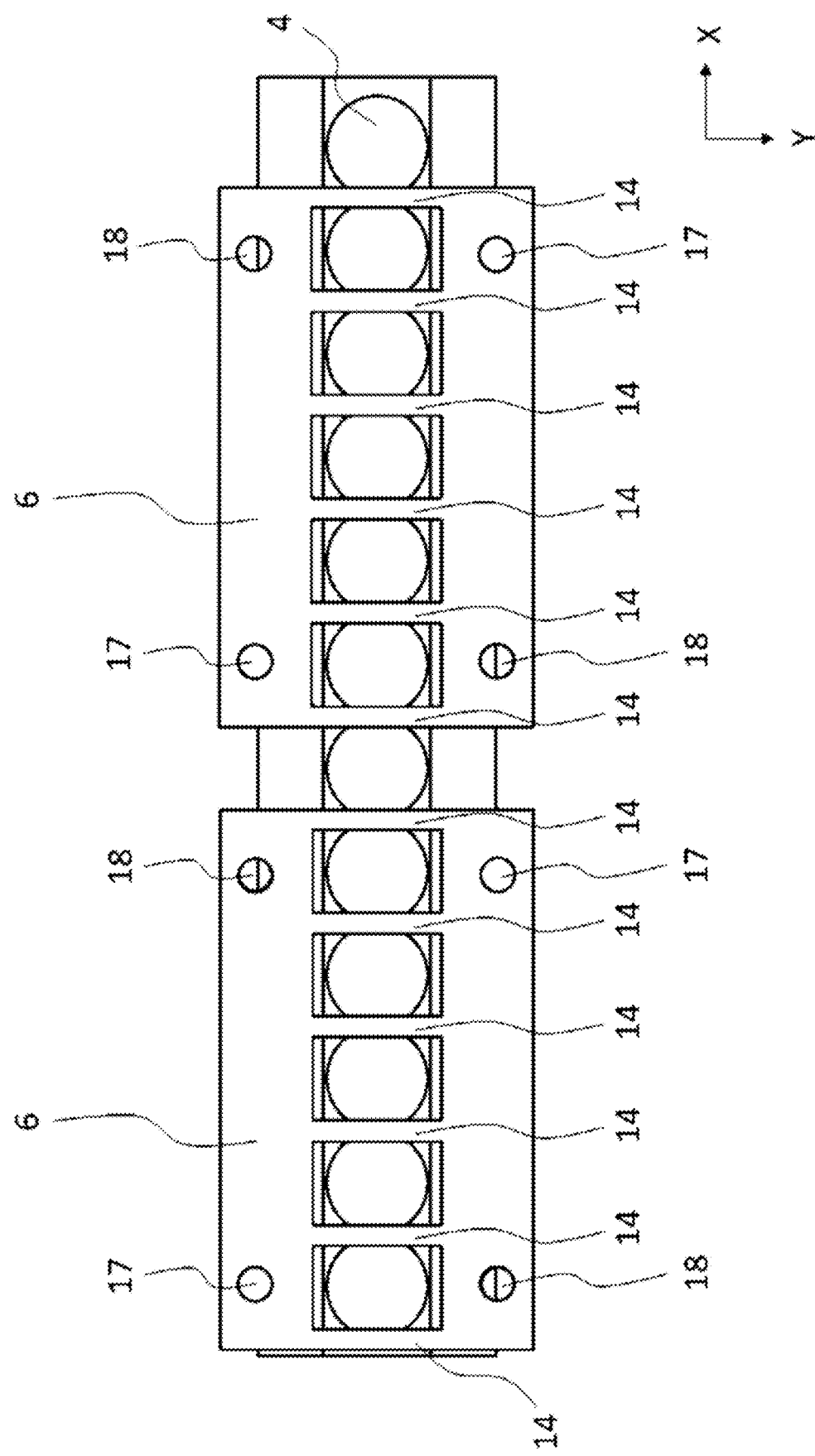
FIG. 7 is a top view of the lens array in the image reading device according to Embodiment 1 on which the slit units are disposed, as viewed from a light receiver in the read depth direction.
Figure 8:
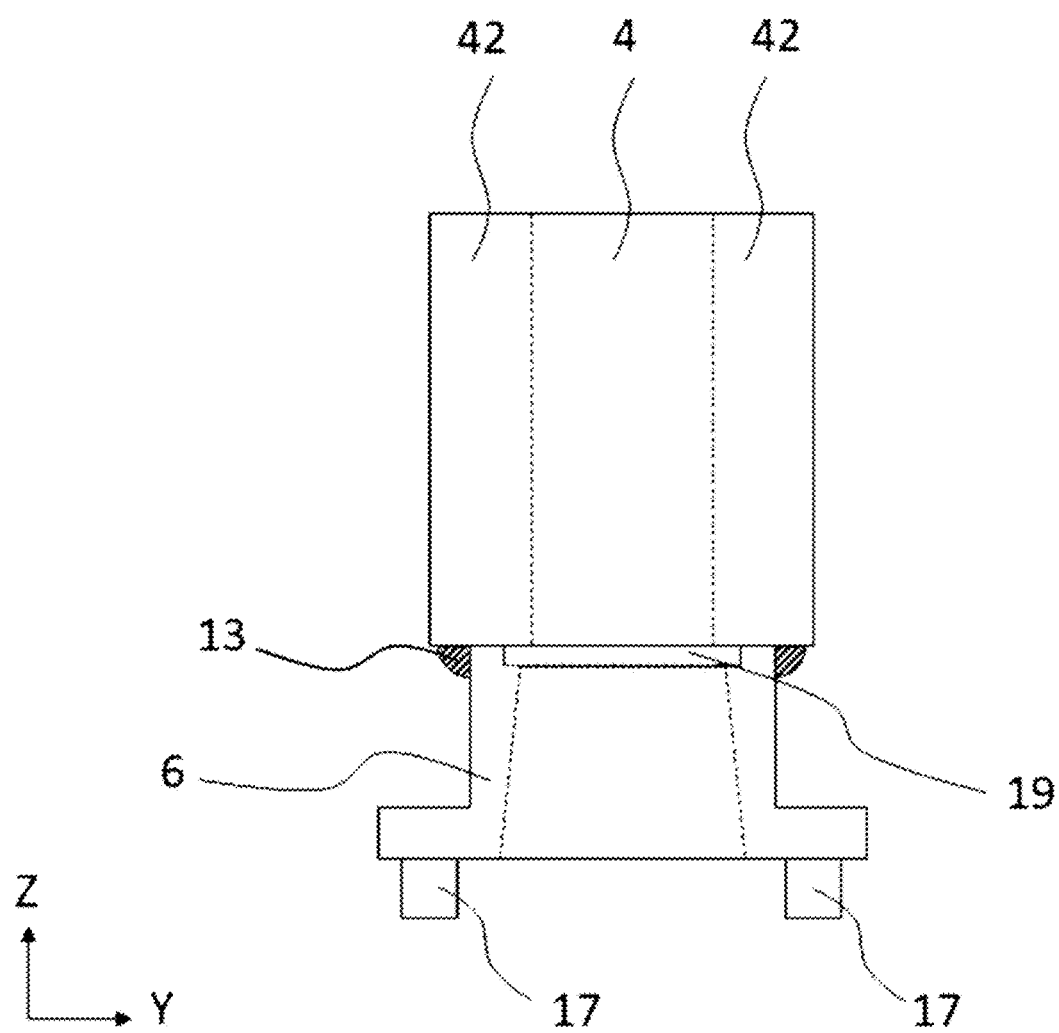
FIG. 8 is a side view of the lens array in the image reading device according to Embodiment 1 on which the slit units are disposed.
Figure 9:
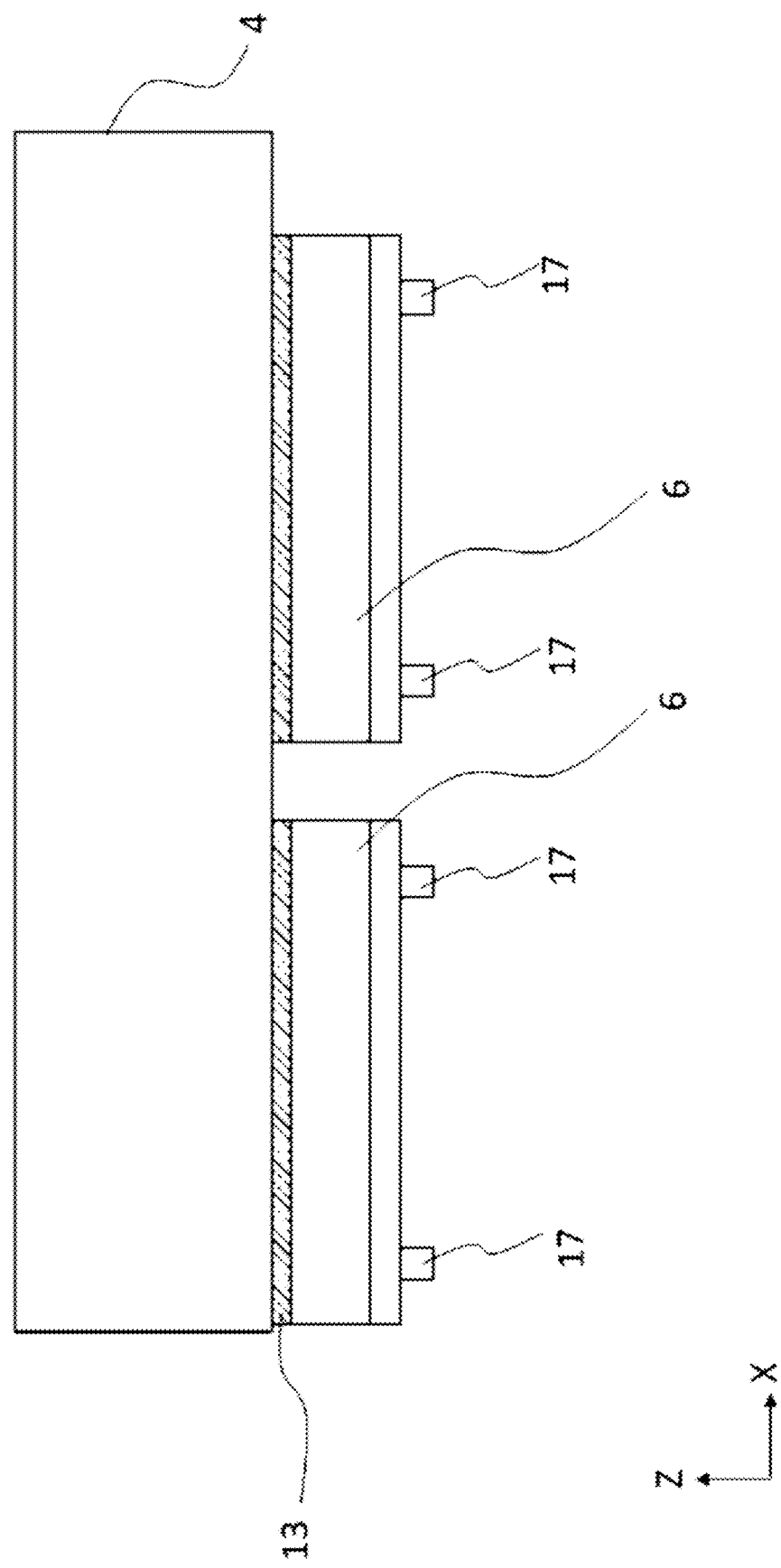
FIG. 9 is a side view of the lens array in the image reading device according to Embodiment 1 on which the slit units are disposed.
Figure 10:
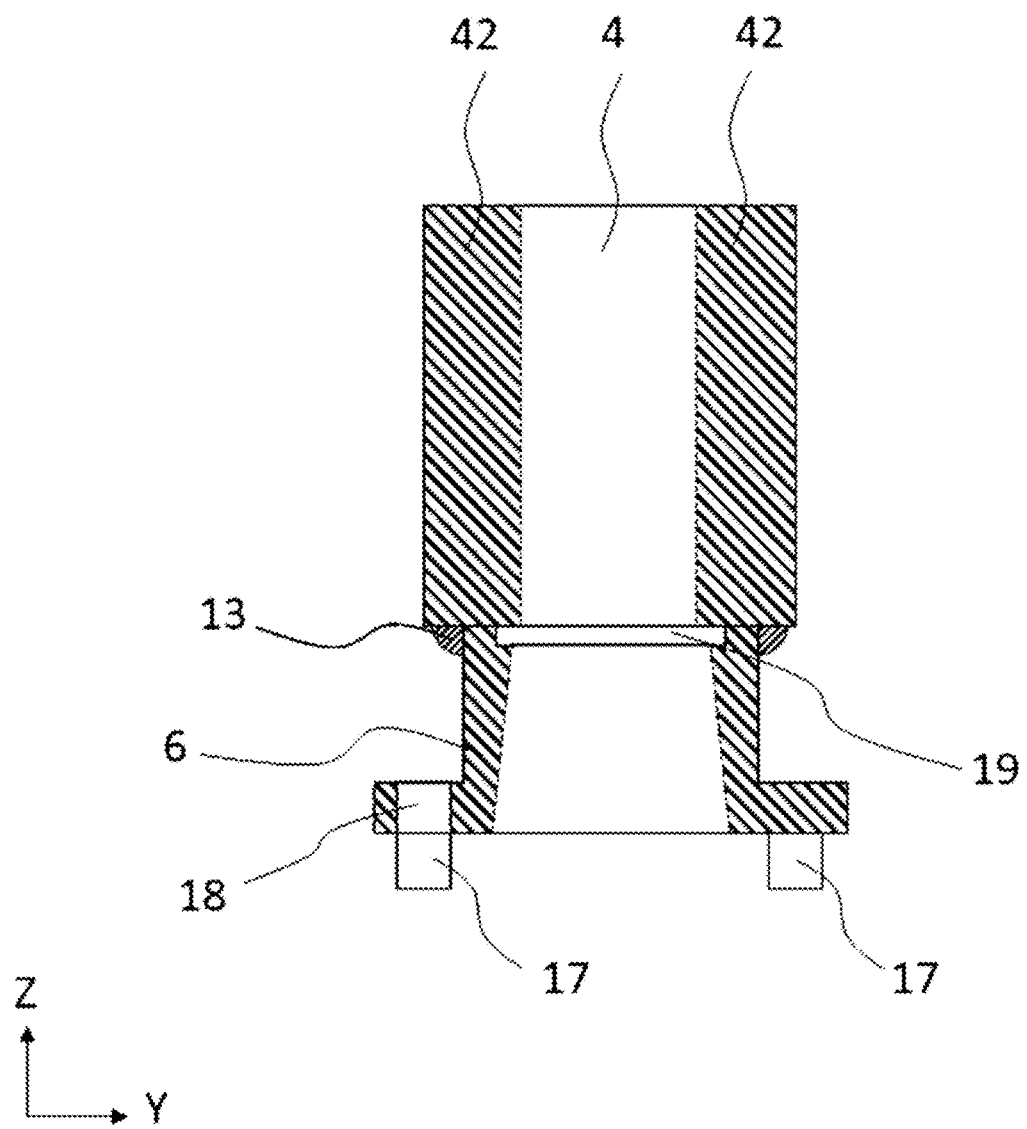
FIG. 10 is a cross-sectional side view of the lens array in the image reading device according to Embodiment 1 on which the slit units are disposed.

FIG. 5 is a perspective view of a slit unit 6. FIG. 6 is a perspective view of the lens array 4 and the holders 42 on which slit units 6 are disposed. FIG. 7 is a top view of the lens array 4 and the holders 42 on which the slit units 6 are disposed, as viewed from the light receiver 7 in the read depth direction. FIG. 8 is a side view of the lens array 4 and the holders 42 on which the slit units 6 are disposed, as viewed in the main scanning direction. FIG. 9 is a side view of the lens array 4 and the holders 42 on which the slit units 6 are disposed, as viewed in the sub-scanning direction. FIG. 10 is a cross-sectional side view of the lens array 4 and the holders 42 on which the slit units 6 are disposed, taken along a dotted line in FIG. 6.

As shown in FIG. 6, the slit units 6 are disposed between the lens array 4 and the light receiver 7. The slit units 6 are arranged in the main scanning direction. The slit units 6 are attached to the light emission surfaces 46 of the holders 42 facing the light receiver 7. The slit units 6 and the holders 42 are bonded to each other with tape with a small elastic force or an adhesive with a small elastic force such as a silicone adhesive. In FIGS. 8 and 9, the slit units 6 and the holders 42 are connected with an adhesive 13.

The slit units 6 are formed from, for example, a resin or a metal. The slit units 6 are formed by, for example, injection molding or stamping. Each of the slit units 6 includes light shielding plates 14 and side plates 15. More specifically, each slit unit 6 includes three or more light shielding plates 14 that are adjacent and are connected with the side plates 15.

The light shielding plates 14 are disposed between the lens array 4 and the light receiver 7. Each light shielding plate 14 is disposed between two lenses 41. Each light shielding plate 14 separates the optical path of one lens 41 from the optical path of another lens 41. In other words, each light shielding plate 14 in the image reading device 100 separates the space corresponding to the optical axis of one lens 41 from the space corresponding to the optical axis of another lens 41. Each light shielding plate 14 has the same thickness. The side plates 15 are disposed on both sides of the light shielding plates 14 in a direction intersecting the main scanning direction to connect each two adjacent light shielding plates 14.

The slit units 6 adjacent to each other are arranged in the main scanning direction with a space therebetween for one optical path of one lens 41. In other words, each two adjacent slit units 6 are not connected with the side plates 15. The optical path of the lens 41 in the space between each two adjacent slit units 6 is separated from another optical path by light shielding plates 14 facing each other each included in a corresponding slit unit of the two adjacent slit units 6.

In the above structure, each slit unit 6 has multiple through-holes 16 arranged in the main scanning direction. Each through-hole 16 is defined by adjacent light shielding plates 14 and the side plates 15. Each through-hole 16 is aligned with the optical axis of the corresponding lens 41.

An optical system including a lens array usually causes a superposed image due to an overlap between the fields of view of adjacent lenses, and is less likely to retain a great depth of focus. The image reading device 100 includes the slit units 6 between the lens array 4 and the light receiver 7 to separate the optical paths of light converged by the lenses 41 from one another. This structure can restrict an overlap between the fields of view of the lenses. The image reading device 100 can thus have a greater depth of focus.

The length of each slit unit 6 in the main scanning direction is determined based on a linear expansion difference between the lens array 4 and the slit units 6. More specifically, the slit units 6 are to have a length in the main scanning direction determined, in a prespecified use temperature range, to allow the positions of the light shielding plates 14 in the slit units 6 to overlap the positions of spaces between one and another lenses 41 in the lens array 4 when the linear expansion difference between the lens array 4 and the slit units 6 occurs at a preselected coefficient of linear expansion of the slit units 6. With the multiple slit units 6 arranged in the main scanning direction, the linear expansion difference between the lens array 4 and the slit units 6 can be determined for the length per slit units 6. Thus, the applicable temperature range can be widened.

Each slit unit 6 has, on the light emission surface facing the light receiver 7, first protrusions 17 protruding toward the light receiver 7. As shown in FIGS. 6 and 7, two first protrusions 17 are disposed at diagonal corners of the light emission surface of the slit unit 6 facing the light receiver 7. Each slit unit 6 has, on the light emission surface facing the light receiver 7, recesses 18 recessed in a direction opposite to the light receiver 7. As shown in FIGS. 6 and 7, two recesses 18 are disposed at diagonal corners of the light emission surface of the slit unit 6 facing the light receiver 7, at which the first protrusions 17 are not disposed. Each slit unit 6 may have any number of first protrusions 17 and recesses 18 at any positions. Each slit unit 6 may include the first protrusions 17 alone or the recesses 18 alone.

The first protrusions 17 and the recesses 18 on the slit units 6 allow a jig formed from, for example, iron to fit to the first protrusions 17 and the recesses 18. When deformed, each slit unit 6 with the first protrusions 17 and the recesses 18 may be corrected into an intended shape by fitting the jig to the corresponding first protrusion 17 or recess 18. Each slit unit 6 usually includes thin light shielding plates 14 with a thickness of less than or equal to 0.3 mm, and thus may be warped or deformed. Depending on the selected material, the slit unit 6 may be warped or deformed when formed by, for example, injection molding. When warpage or deformation is unavoidable, the warped or deformed slit unit 6 may be corrected before being fastened to the holders 42. In the above structure, the slit unit 6 can be fastened to the holders 42 after being corrected into an intended shape with the jig fitted to the corresponding first protrusion 17 or recess 18. Such correction of the shape eliminates the use of a slide core, and can simplify a die for the slit units 6. This also allows correction of the posture of the slit units 6, and improves flare characteristics.

Each slit unit 6 includes a relief portion 19 recessed on the surface facing the lens array 4 in a portion facing the lens array 4. Thus, each slit unit 6 is in contact with the holders 42 alone. In other words, the light emission surfaces 45 of the lenses 41 facing the light receiver 7 are not in direct contact with the slit units 6. This structure thus reduces scratches caused by the slit units 6 coming into contact with the lenses 41.

As shown in FIG. 10, the through-holes 16 in each slit unit 6 are tapered to facilitate formation of the through-holes 16 in the slit unit 6 and to increase the bonding area of the slit unit 6 to the holders 42.

Each slit unit 6 has unevenness on the surface formed by etching. The etching is performed with an acid solution or an alkaline solution. More specifically, such unevenness is formed on the surfaces of the light shielding plates 14 in each slit unit 6 facing outward and the surfaces of the side plates 15 in each slit unit 6 facing outward. Etching using an alkaline solution involves cleavage of ester bonds in polymers to process a resin surface. Etching using an acid solution involves acid corrosive action to process the surface of a component. For example, etching with an acid solution such as a permanganic acid, a sulfuric acid, or a chromic acid or etching with an alkaline solution can form unevenness sufficient for reducing reflection on the surfaces of the light shielding plates. The slit unit 6 with a large degree of unevenness has a light absorption effect resulting from multiple reflection of light entering the structure. Unintended light incident on the surfaces of the light shielding plates 14 in each slit unit 6 facing outward and the surfaces of the side plates 15 in the slit unit 6 facing outward is not absorbed by the unevenness on the surfaces to prevent flares. The unevenness specifically has an arithmetic mean roughness (Ra) of greater than or equal to 2.5 µm, and more specifically has an arithmetic mean roughness (Ra) of greater than or equal to 3.5 µm. Etching may be performed with an alkaline solution (such as a sodium hydroxide) used in, for example, plating. The slit units 6 may be formed from a resin to have sufficient unevenness formed by etching.

Instead of etching, the surface may be treated with matte coating to have unevenness on the surface. However, coating the slit units 6 including the light shielding plates 14 at short intervals is difficult. In contrast, etching simply includes immersion of slit units 6 into a chemical solution, and thus is easy.

Figure 27:
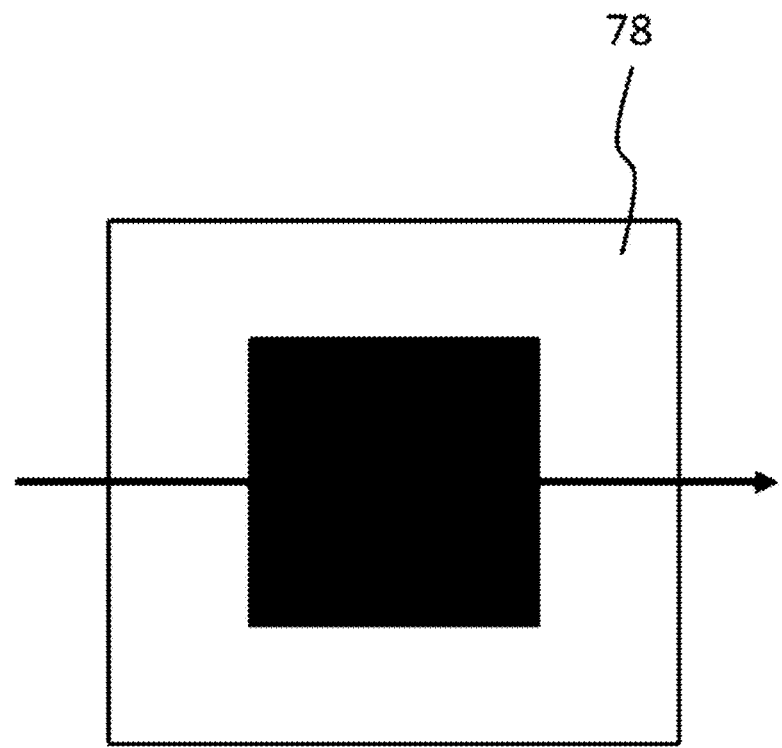
FIG. 27 is diagram of a document showing the reading position and direction.
Figure 28:
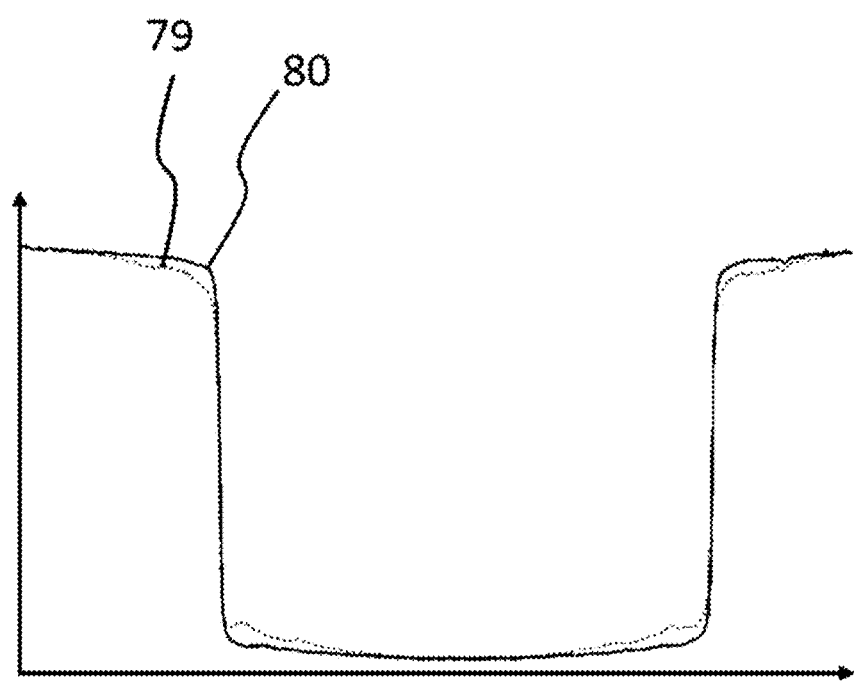
FIG. 28 is a graph showing comparison in flare reduction performance between light shielding plates with a greater arithmetic mean roughness of surface unevenness and light shielding plates with a smaller arithmetic mean roughness of surface unevenness.

FIGS. 27 and 28 are diagrams describing comparison in flare reduction performance between the light shielding plates 14 with a greater arithmetic mean roughness (Ra) of surface unevenness and the light shielding plates 14 with a smaller arithmetic mean roughness (Ra) of surface unevenness. FIG. 27 shows a document 78 with the reading position and direction indicated with an arrow. FIG. 28 is a graph showing comparison between flares when the document 78 is read at the position of arrow in FIG. 27 in the direction of the arrow. FIG. 28 is a graph acquired by reading a portion of the document 78 in which the color of the document 78 changes in the order of white, black, and white, as shown in FIG. 27. In FIG. 28, the horizontal axis indicates the pixel, and the vertical axis indicates the light output value. The light output value is higher at higher positions on the vertical axis. A dotted line 79 indicates the light output value for a smaller arithmetic mean roughness (Ra) of surface unevenness of the light shielding plates 14. A solid line 80 indicates the light output value for a greater arithmetic mean roughness (Ra) of surface unevenness of the light shielding plates 14. The light output steeply changes at the boundary of the read document 78 from white to black and at the boundary from black to white. As shown in FIG. 28, for the smaller arithmetic mean roughness (Ra), a flare affects the light output without the steep change at the boundaries. For the greater arithmetic mean roughness (Ra), the light output steeply changes following the changes of the colors of the document 78. FIG. 28 shows that the arithmetic mean roughness (Ra) greatly affects the reading performance of the document.

The light shielding plates 14 and the side plates 15 in the slit units 6 can reduce an overlap between the fields of view of the lenses 41, and allow a greater depth of focus. To block outgoing light from the lenses 41, the light shielding plates 14 and the side plates 15 radiate the reflected light of the blocked light. When the reflected light radiated from the light shielding plates 14 and the side plates 15 is incident on the light receiver 7 as a stray light component, the light appears as a flare. With light from the lens 41 restricted to a range of about 9 to 15° by the lens 41, the light shielding plates 14 and the side plates 15 are to prevent reflection also for a smaller angle of incidence. The slit units 6 with uneven surfaces resulting from etching can reduce reflection from the light shielding plates 14 and the side plates 15, thus reducing flares. This is particularly suitable for the slit units 6 with glossy surfaces formed by injection molding.

A method for forming surface unevenness of the slit units 6 may use a die treated with matte finish when the slit units 6 are manufactured by injection molding. With this method, the matte finish pattern is transferred to the surfaces of the molded slit units 6 to form the unevenness for reducing reflection. To form unevenness with a die, the die is to have a great draft. To avoid any decrease in the light output, the slit units 6 are to have the light shielding plates 14 with a small thickness of about 0.2 to 0.42 mm. Thus, the die cannot have a great draft for removing the finished product from the die. This method may thus inapplicable to the slit units 6. Another method for forming the unevenness may include blasting the surface with particles such as sandblasting. However, the light shielding plates 14 in each slit unit 6 are at short pitches, and thus blasting the surfaces of the light shielding plates 14 with particles may be inappropriate. This example method may be inapplicable to the slit units 6. In other words, etching the slit units 6 to form the uneven surfaces allows the light shielding plates 14 to be at short pitches without a great draft.

Figure 19:
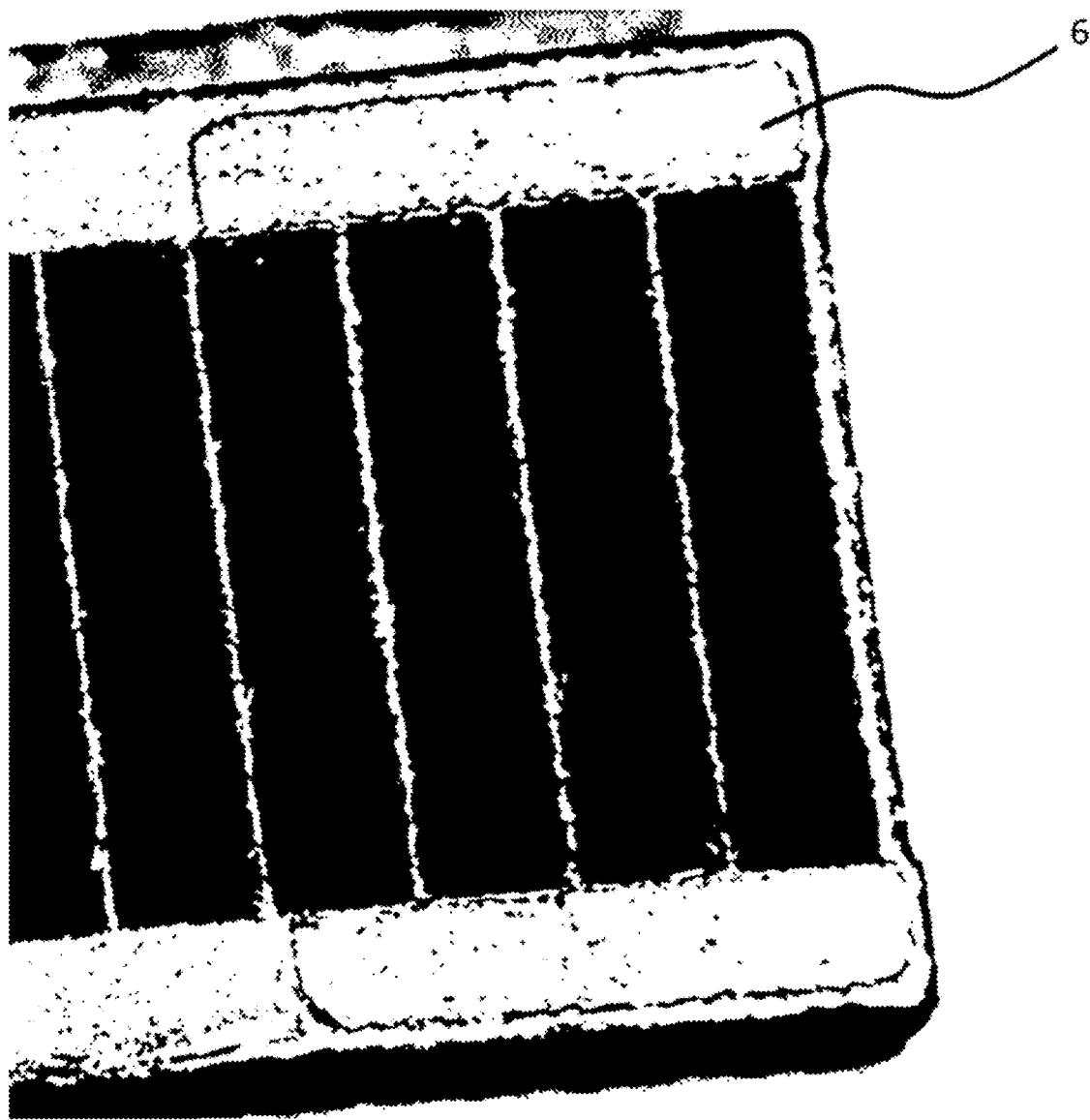
FIG. 19 is an external view of the slit unit in the image reading device according to Embodiment 1.
Figure 20:
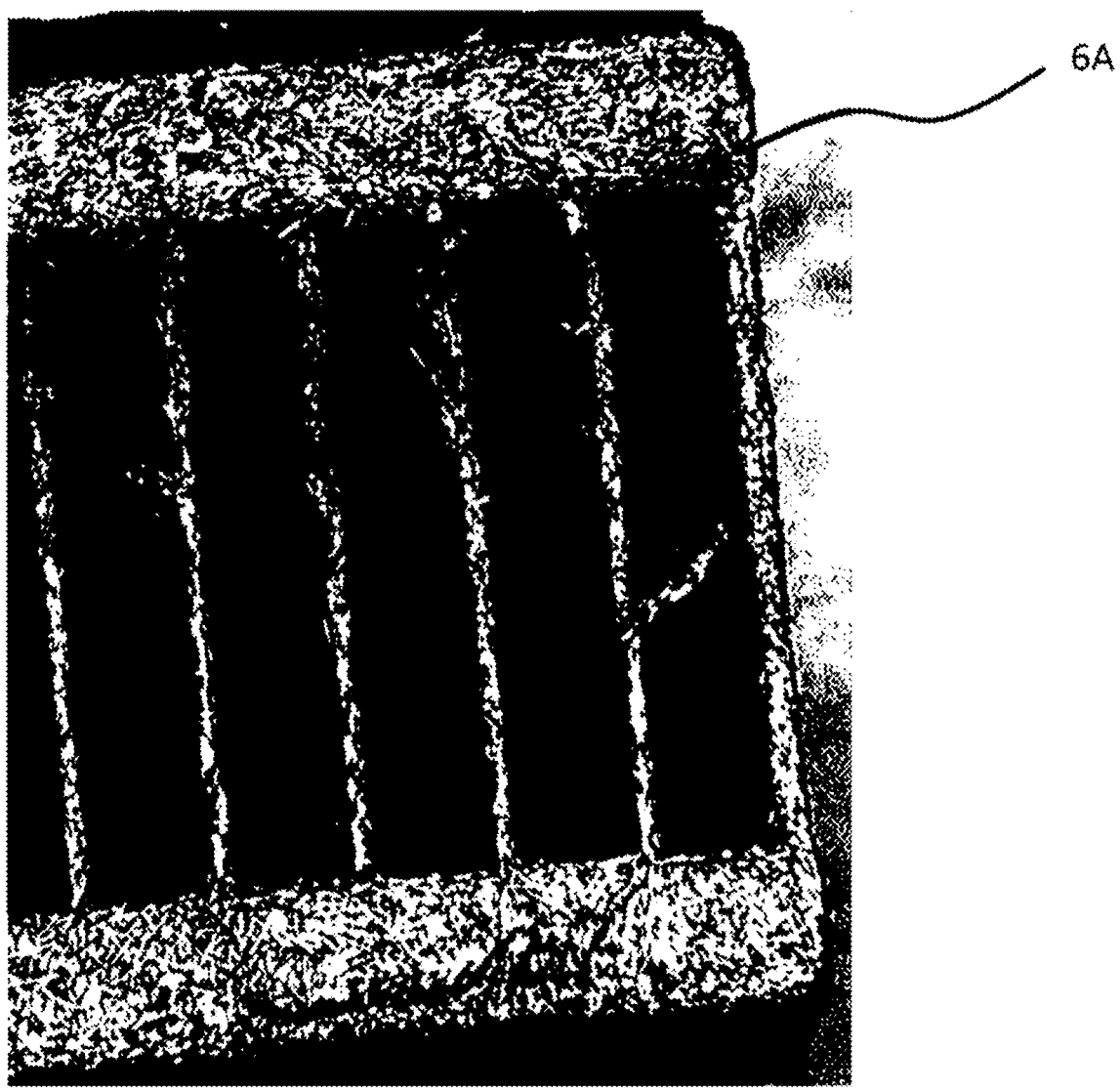
FIG. 20 is an external view of a slit unit in a comparative example.

In this example, the slit units 6 are formed from a resin containing a granular filler. In another example, the slit units 6 are formed from a resin containing a granular filler and a fibrous filler. The granular filler may have a particle diameter of 15 to 80 μm. The content may be within a range from 30 to 50 percent by weight. When the slit units 6 are manufactured by injection molding, the slit units 6 are usually formed from a resin with high fluidity such as a liquid crystal polymer (LCP). However, the LCP is an expensive and highly anisotropic resin, and thus is usually mixed with a filler. FIG. 19 is an external view of the slit units 6 formed from a resin containing a granular filler (such as calcium carbonate or talc) and subjected to etching. For a comparison, FIG. 20 is an external view of slit units 6A formed from a resin containing a fibrous filler (glass filler) and subjected to acid etching. A glass filler (glass fiber) that is a fibrous filler may be used as atypical filler. When the resin or the glass filler is dissolved in etching, the filler and the shape of the filler are likely to remain on the surface and form the unevenness on the surface. A fibrous glass filler is inexpensive and increases the strength of the resin. However, the glass filler has a white surface, and thus has high reflectivity. Additionally, etching removes the resin around the glass filler, and can cause fuzz of the glass filler at the end surfaces of the light shielding plates 14 and the side plates 15. The fuzz in a broader range in the main scanning direction as shown in FIG. 20 produces the same effects as the light shielding plates 14 and the side plates 15 being thicker. This causes flares. Thus, using a glass filler as a resin filler as in the slit units 6A in the comparative example may be inappropriate. As shown in FIG. 19, the slit units 6 containing a granular filler as a resin filler does not have fuzz, unlike in the example in which a glass filler is used. In other words, the slit units 6 formed from a resin containing a granular filler can reduce flares, and can be manufactured inexpensively. Although the slit units 6 mainly contain a granular filler as a filler, the slit units 6 may contain a small amount of glass filler. More specifically, the slit units 6 may be formed from a resin containing a granular filler and a fibrous filler. In this case, the resin contains a greater amount of granular filler than the fibrous filler. The resin may contain the granular filler within a range from 30 to 50 percent by weight. The resin may be black.

The image reading device 100 according to Embodiment 1 can reduce flares. The multiple slit units 6 are arranged in the main scanning direction such that each two adjacent slit units 6 are arranged with a space therebetween for one optical path of one lens 41. When a single slit unit extends across in the main scanning direction instead of the multiple slit units, tolerance accumulates and may cause a pitch difference between the light shielding plates 14 and the lenses 41. The light shielding plates 14 may thus be shifted inward over the lens 41 at the end portion. In such a case, the light shielding plates 14 may cause more stray light, and thus more flares. In contrast, multiple separate slit units can each accommodate the pitch difference and reduce the shifts of the light shielding plates 14 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 14 resulting from collisions and stray light resulting from tilting of the light shielding plates 14, thus reducing flares.

The side plates 15 are eliminated from between each two adjacent slit units 6. Thus, any flare in the sub-scanning direction between one slit unit 6 and another slit unit 6 adjacent to the one slit unit 6 escapes toward the frame 1 and can be less visible during image capturing. Additionally, each slit unit 6 with a shorter length facilitates the manufacturing process such as injection molding or stamping. The surface of the lens array 4 facing the light receiver 7 is ground into a flat surface, and the center axes of the through-holes 16 in each slit unit 6 connected to the surface facing the light receiver 7 are perpendicular to the surface facing the light receiver 7. This structure can easily reduce misalignment of the center axes of the through-holes 16 in each slit unit 6 with the optical axes of the lenses 41. The slit units 6 on the flat surface reduce tilting of the light shielding plates 14 more than the slit units 6 on convex lenses.

The slit units 6 with uneven surfaces resulting from etching with an alkaline or acid solution can reduce reflection from the light shielding plates 14 and the side plates 15, thus reducing flares. The slit units 6 formed from a resin containing a granular filler by injection molding can be manufactured inexpensively.

Embodiment 2

Figure 11:
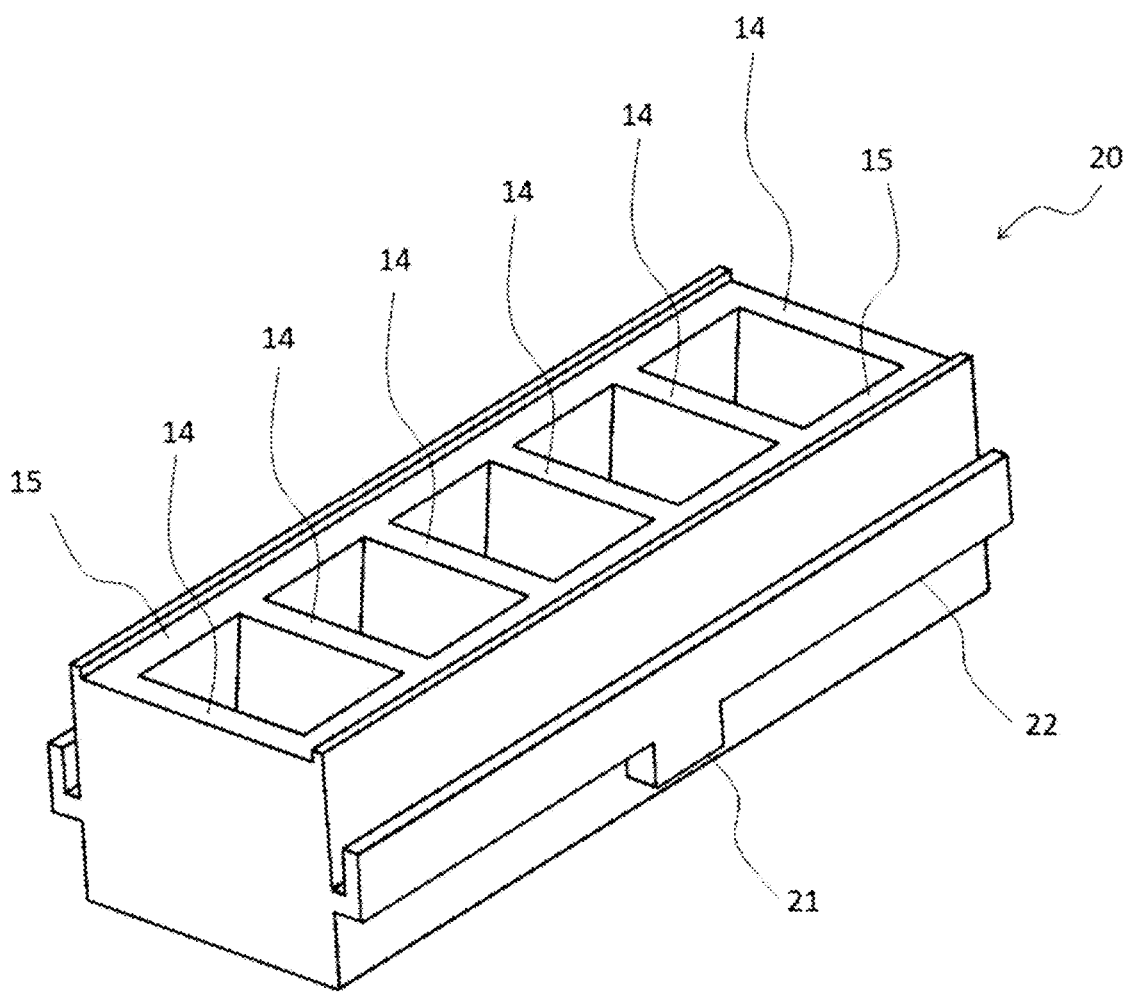
FIG. 11 is a perspective view of a slit unit in an image reading device according to Embodiment 2.
Figure 12:
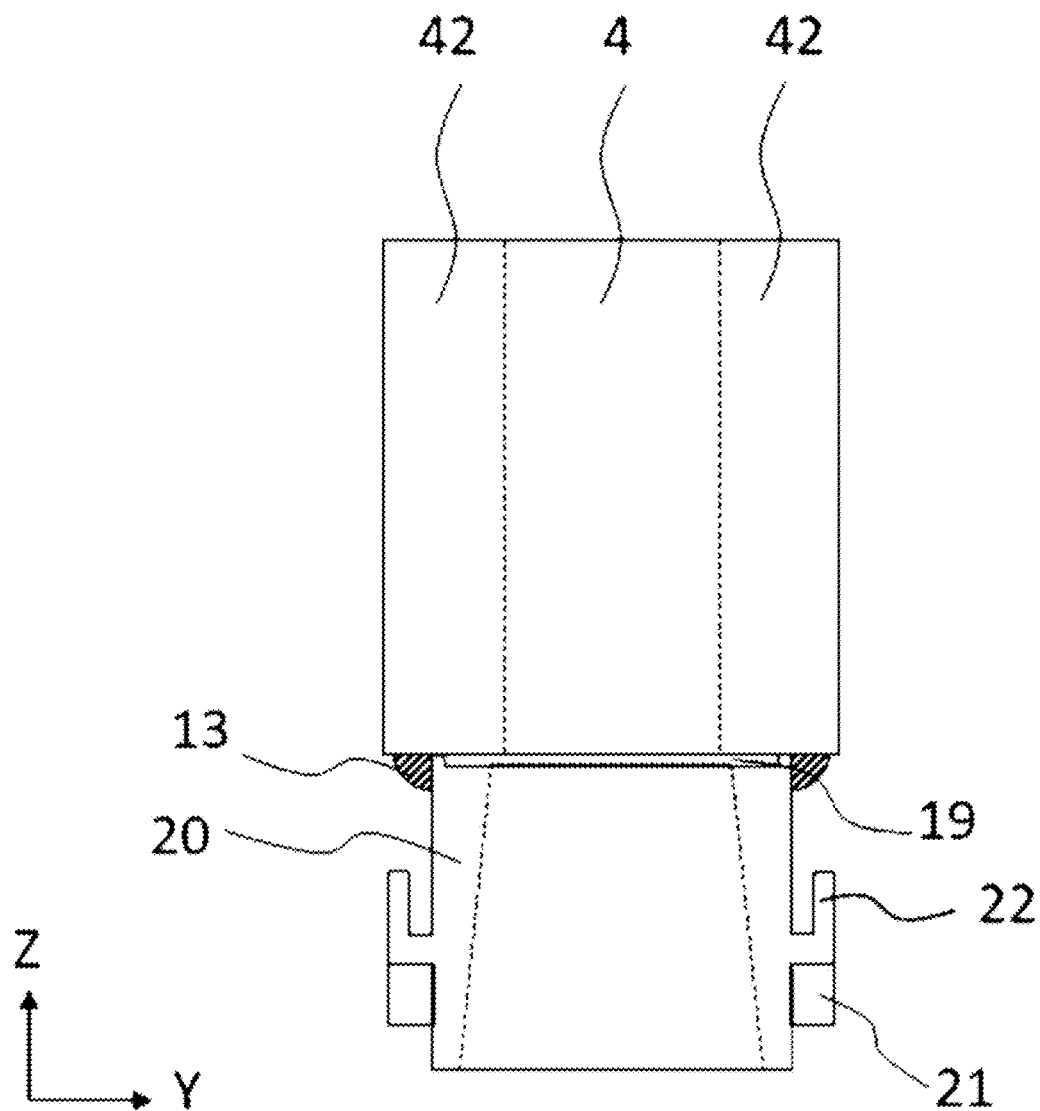
FIG. 12 is a side view of a lens array in the image reading device according to Embodiment 2 on which the slit units are disposed.

An image reading device 200 according to Embodiment 2 is described below with reference to the drawings. In the drawings, the same reference signs denote the same or corresponding components, and such components are not described in detail. FIG. 11 is a perspective view of a slit unit 20 in the image reading device 200 according to Embodiment 2. FIG. 12 is a side view of a lens array 4 and holders 42 in the image reading device 200 according to Embodiment 2 on which the slit unit 20 is disposed. The image reading device 200 according to Embodiment 2 differs from the image reading device 100 in the structure of the slit units 6. The other components are substantially the same as the components in Embodiment 1. The same reference signs denote the same or corresponding components described in the above embodiments, and such components are not described repeatedly.

The image reading device 200 includes multiple slit units 20 between the lens array 4 and the light receiver 7. The slit units 20 are arranged in the main scanning direction. The slit units 20 each include, on each side plate 15, a second protrusion 21 protruding from the side plate 15 in a direction intersecting the main scanning direction. Each slit unit 20 also includes, on each side plate 15, a groove 22 recessed in a direction from the lens array 4 toward the light receiver 7. Each second protrusion 21 and the corresponding groove 22 are an integral member. Each slit unit 20 may include any number of second protrusions 21 and grooves 22 at any positions. Each slit unit 20 may include the second protrusions 21 alone or the grooves 22 alone. The slit units 20 eliminates the first protrusions 17 and the recesses 18 on the slit units 6. The other components are substantially the same as the components in each slit unit 6. Similarly to the first protrusions 17 and the recesses 18, the second protrusions 21 and the grooves 22 receive, for example, a jig formed from iron or another material to fit. When deformed, each slit unit 20 including the second protrusions 21 and the grooves 22 can be corrected into an intended shape by placing the jig fitted to the corresponding second protrusion 21 or the groove 22.

Each slit unit 20 without the first protrusions 17 or the recesses 18 on the surface facing the light receiver 7 can reduce the likelihood of lowered resin fluidity, thus allowing the shaping of the light shielding plates 14. This structure can thus easily reduce deformation of the slit units 20. Each slit unit 20 may include the first protrusions 17 and the recesses 18 as appropriate.

The image reading device 200 according to Embodiment 2 can also reduce flares. The slit units 20 are arranged in the main scanning direction such that each two adjacent slit units 20 are arranged with a space therebetween for one optical path of one lens 41. When a single slit unit extends across in the main scanning direction instead of the multiple slit units, tolerance accumulates and may cause a pitch difference between the light shielding plates 14 and the lenses 41. The light shielding plates 14 may thus be shifted inward over the lens 41 at the end portion. In such a case, the light shielding plates 14 may cause more stray light, and thus more flares. In contrast, multiple separate slit units can each accommodate the pitch difference and reduce the shifts of the light shielding plates 14 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 14 resulting from collisions and stray light resulting from tilting of the light shielding plates 14, thus reducing flares.

The side plates 15 are eliminated from between each two adjacent slit units 20. Thus, any flare in the sub-scanning direction between one slit unit 20 and another slit unit 20 adjacent to the one slit unit 20 escapes toward the frame 1 and can be less visible during image capturing. Additionally, the slit units 20 with a shorter length facilitate manufacturing processes such as injection molding or stamping. The surface of the lens array 4 facing the light receiver 7 is ground into a flat surface, and the center axes of the through-holes 16 in each slit unit 20 connected to the surface facing the light receiver 7 are perpendicular to the surface facing the light receiver 7. This structure can easily reduce misalignment of the center axes of the through-holes 16 in each slit unit 20 with the optical axes of the lenses 41. The slit units 20 on the flat surface reduce tilting of the light shielding plates 14 more than the slit units 20 on convex lenses. This structure can easily reduce deformation of the slit units 20.

The slit units 20 with uneven surfaces resulting from etching with an alkaline or acid solution can reduce reflection from the light shielding plates 14 and the side plates 15, thus reducing flares. The slit units 20 formed from a resin containing a granular filler by injection molding can be manufactured inexpensively.

Embodiment 3

Figure 13:
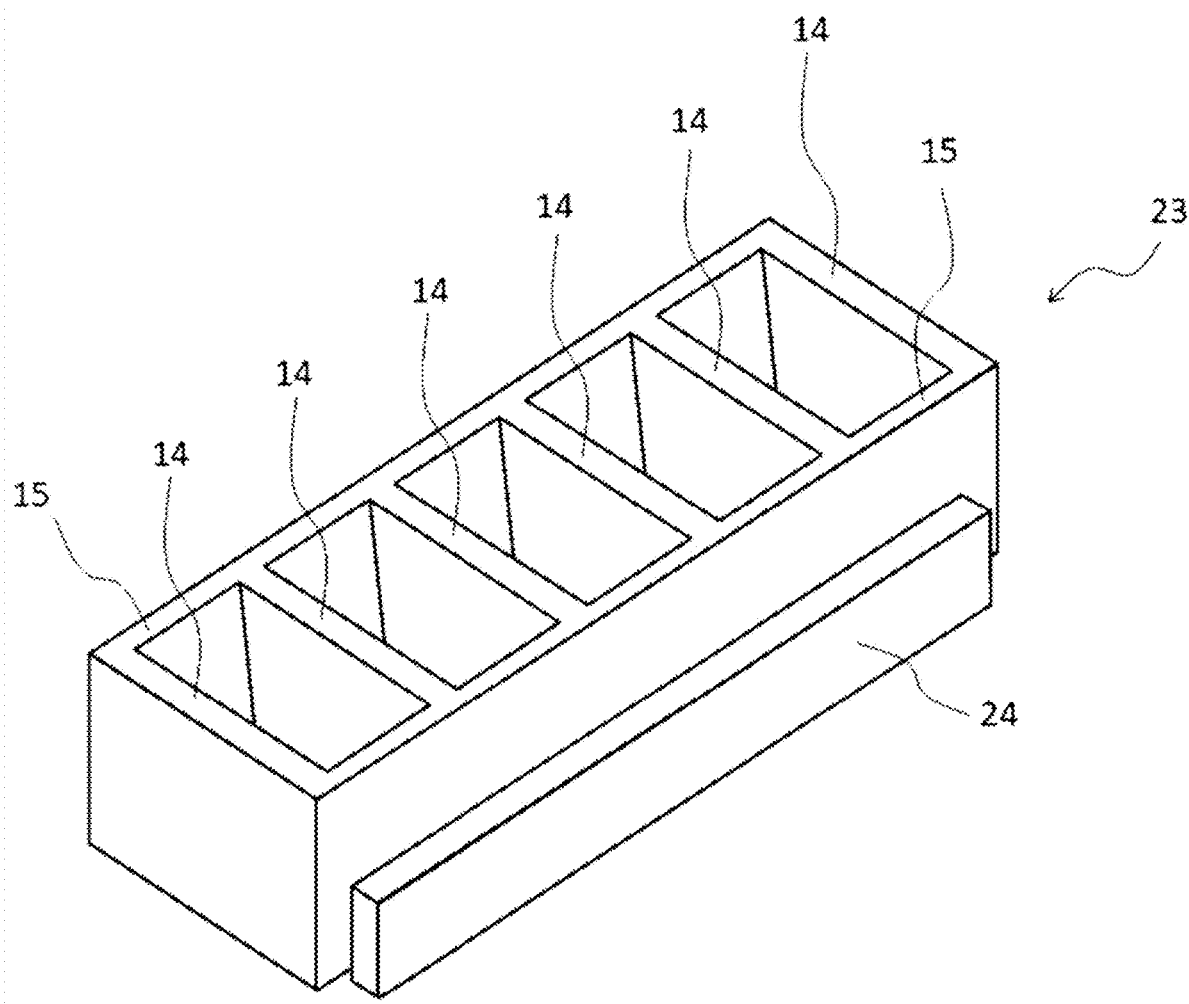
FIG. 13 is a perspective view of a slit unit in an image reading device according to Embodiment 3.
Figure 14:
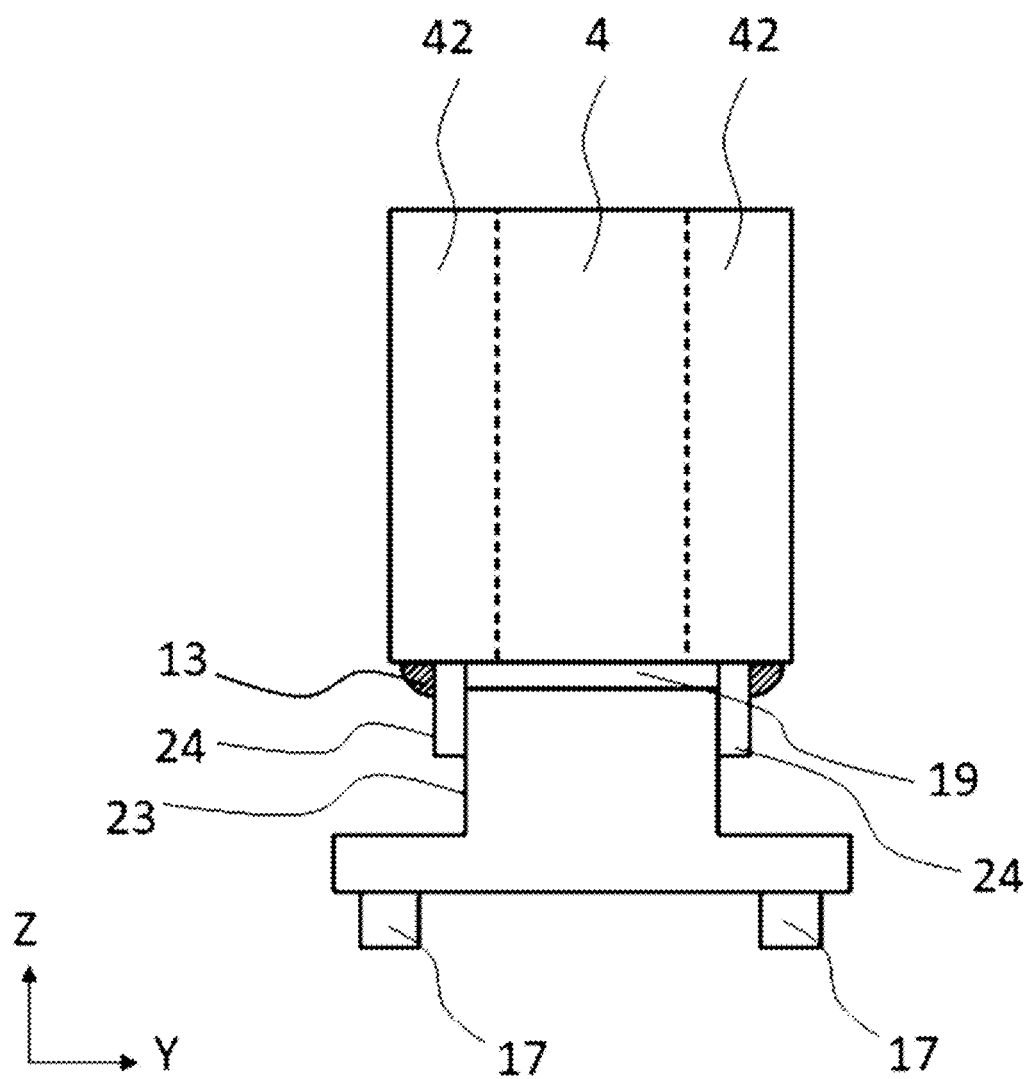
FIG. 14 is a side view of a lens array in the image reading device according to Embodiment 3 on which the slit units are disposed.

An image reading device 300 according to Embodiment 3 is be described below with reference to the drawings. In the drawings, the same reference signs denote the same or corresponding components, and such components are not described in detail. FIG. 13 is a perspective view of a slit unit 23 in the image reading device 300 according to Embodiment 3. FIG. 14 is a side view of a lens array 4 and holders 42 in the image reading device 300 according to Embodiment 3 on which the slit units 23 are disposed. The image reading device 300 according to Embodiment 3 differs from the image reading devices 100 and 200 in the structures of the slit units 6 and 20. The other components are substantially the same as the components in Embodiments 1 and 2. The same reference signs denote the same or corresponding components described in the above embodiments, and such components are not described repeatedly.

Figure 15:
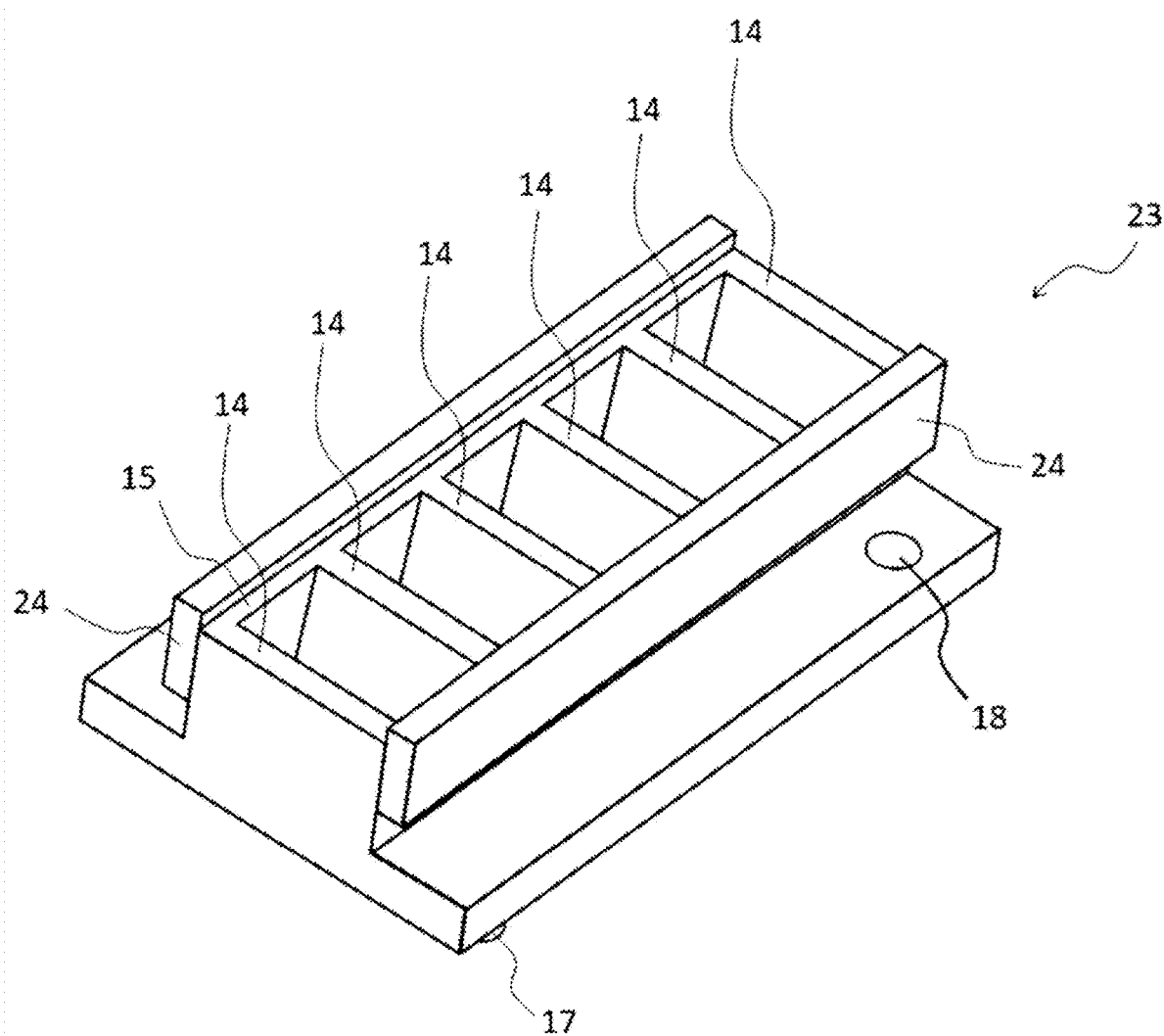
FIG. 15 is a perspective view of a slit unit with another structure in the image reading device according to Embodiment 3.

The image reading device 300 includes multiple slit units 23 between the lens array 4 and the light receiver 7. The slit units 23 are arranged in the main scanning direction. The slit units 23 differ from the slit units 6 as described below. Each slit unit 23 includes, on each of both side plates 15, a second side plate 24 having an end portion protruding from the surface facing the lens array 4. The second side plates 24 are disposed on both sides of the slit unit 23 in a direction intersecting the main scanning direction. The side plates 15 and the second side plates 24 are bonded together with, for example, an adhesive or tape. The end portions of the second side plates 24 are connected to the surfaces of the holders 42 facing the light receiver 7. In this structure, the light emission surface 45 of each lens 41 facing the light receiver 7 is not in direct contact with the slit unit 23. This structure eliminates the relief portion 19 on the surface of the slit unit 23 facing the lens array 4. The side plates 15 of the slit unit 23 have a length in the main scanning direction greater than or equal to the length of the second side plates 24 in the main scanning direction. In this structure, surfaces extending in the main scanning direction between the lens array 4 and the slit units 23 are closed by the second side plate 24. This structure can block light from the lenses 41 from entering the frame 1. Although FIG. 13 shows the slit unit 23 without the first protrusions 17 and the recesses 18, the slit unit 23 may include the first protrusions 17 and the recesses 18 as shown in FIG. 15. The other components are substantially the same as the components in each slit unit 6.

The image reading device 300 according to Embodiment 3 can also reduce flares. The slit units 23 are arranged in the main scanning direction such that each two adjacent slit units 23 are arranged with a space therebetween for one optical path of one lens 41. When a single slit unit extends across in the main scanning direction instead of the multiple slit units, tolerance accumulates and may cause a pitch difference between the light shielding plates 14 and the lenses 41. The light shielding plates 14 may thus be shifted inward over the lens 41 at the end portion. In such a case, the light shielding plate 14 shifted inward over the lens 41 may cause more stray light, and thus more flares. In contrast, multiple separate slit units can each accommodate the pitch difference and reduce the shifts of the light shielding plates 14 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 14 resulting from collisions and stray light resulting from tilting of the light shielding plates 14, thus reducing flares.

The side plates 15 are eliminated from between each two adjacent slit units 23. Thus, any flare in the sub-scanning direction between one slit unit 23 and another slit unit 23 adjacent to the one slit unit 23 escapes toward the frame 1 and can be less visible during image capturing. Additionally, the slit units 23 with a shorter length facilitate manufacturing processes such as injection molding or stamping. The surface of the lens array 4 facing the light receiver 7 is ground into a flat surface, and the center axes of the through-holes 16 in each slit unit 23 connected to the surface facing the light receiver 7 are perpendicular to the surface facing the light receiver 7. This structure can easily reduce misalignment of the center axes of the through-holes 16 in each slit unit 23 with the optical axes of the lenses 41. The slit units 23 on the flat surface reduce tilting of the light shielding plates 14 more than the slit units 23 on convex lenses.

The slit units 23 with uneven surfaces resulting from etching with an alkaline or acid solution can reduce reflection from the light shielding plates 14 and the side plates 15, thus reducing flares. The slit units 23 formed from a resin containing a granular filler by injection molding can be manufactured inexpensively.

Embodiment 4

Figure 16A:
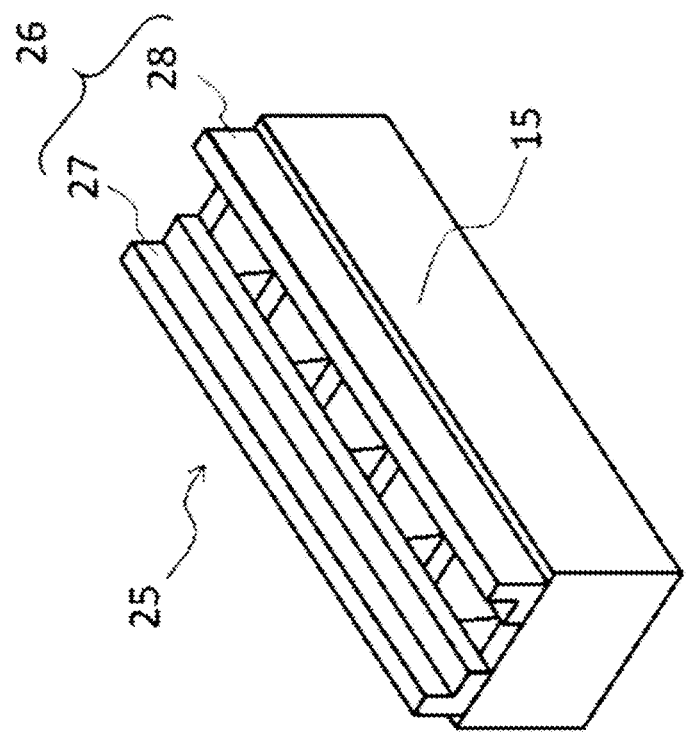
FIGS. 16A and 16B are perspective views of a slit unit in an image reading device according to Embodiment 4.
Figure 16B:
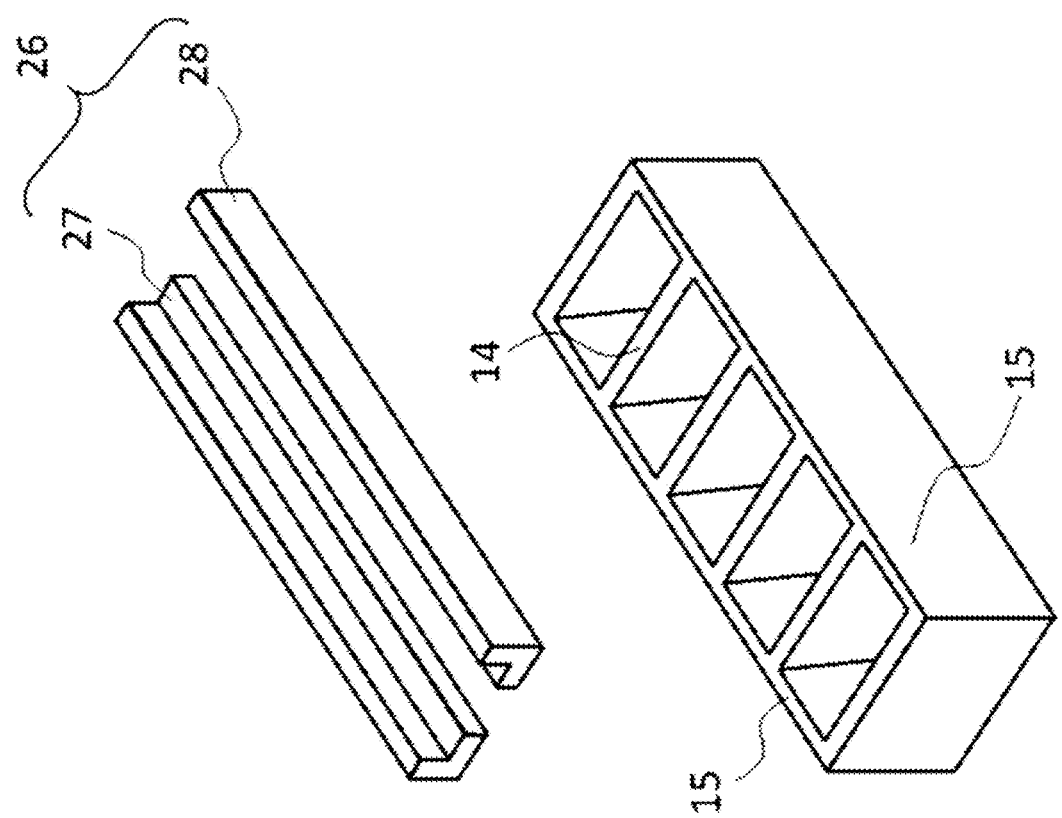
Figure 17:
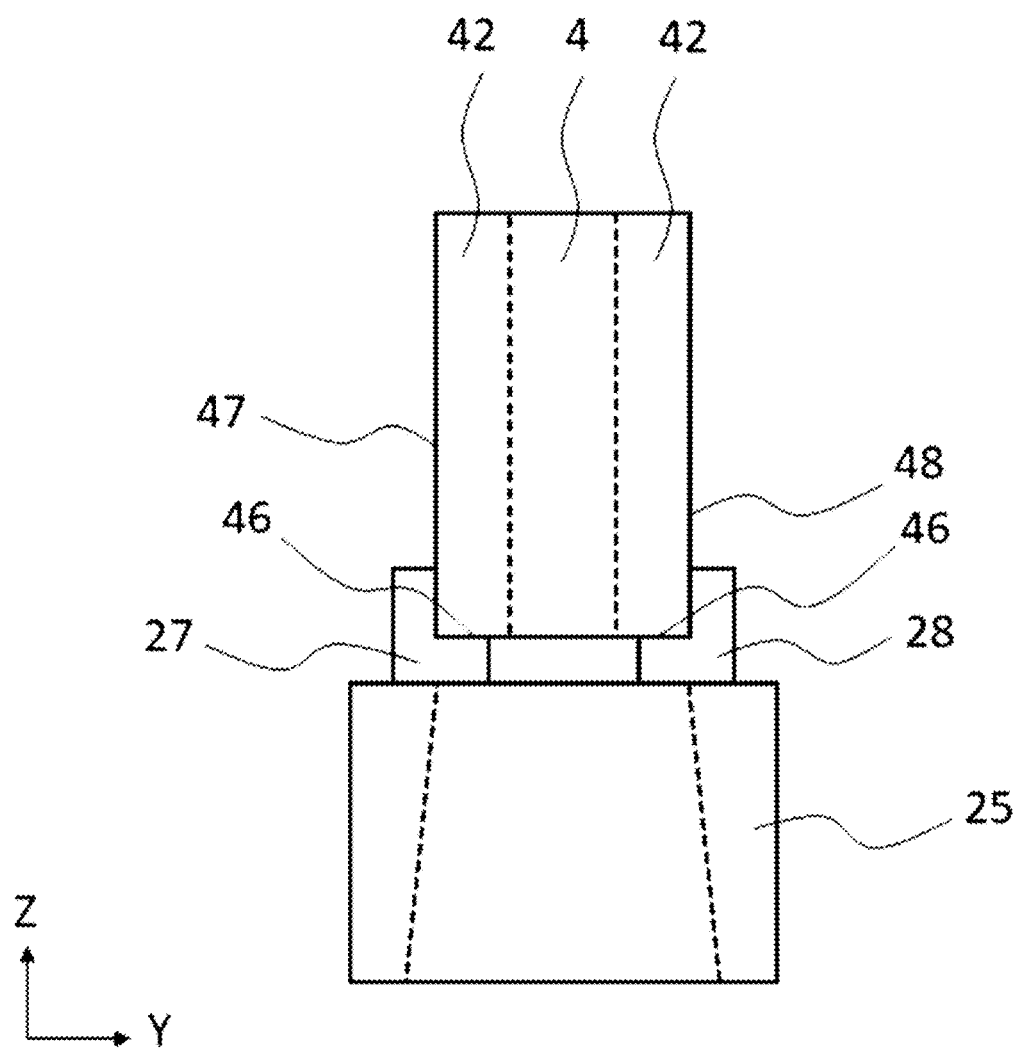
FIG. 17 is a side view of a lens array in the image reading device according to Embodiment 4 on which the slit units are disposed.

An image reading device 400 according to Embodiment 4 is described below with reference to the drawings. In the drawings, the same reference signs denote the same or corresponding components, and such components are not described in detail. FIGS. 16A and 16B are perspective views of a slit unit 25 in the image reading device 400 according to Embodiment 4. FIG. 17 is a side view of a lens array 4 and holders 42 in the image reading device 400 according to Embodiment 4 on which the slit units 25 are mounted. The image reading device 400 according to Embodiment 4 differs from the image reading devices 100 to 300 in the structures of the slit units 6, 20, and 23. The other components are substantially the same as the components in the other embodiments. The same reference signs denote the same or corresponding components described in the above embodiments, and such components are not described repeatedly.

The image reading device 400 includes multiple slit units 25 between the lens array 4 and the light receiver 7. The slit units 25 are arranged in the main scanning direction. The slit units 25 differ from the slit units 6 as described below. Each slit unit 25 includes a connector 26 at least partially disposed on portions of the surfaces of the light shielding plates 14 facing the lens array 4. The connector 26 connects the slit unit 25 to the holders 42. The connector 26 is formed from a material having the same coefficient of linear expansion as the holders 42. The connector 26 having the same coefficient of linear expansion as the holders 42 can reduce a linear expansion difference between the connector 26 and the holders 42 at higher temperatures. The side plates 15 of each slit unit 25 have a length in the main scanning direction greater than or equal to the length of the connector 26 in the main scanning direction. In this structure, surfaces extending perpendicularly to the sub-scanning direction between the lens array 4 and the slit unit 25 are closed by the connector 26. This structure can block light from the lens 41 from entering the frame 1, allows the surfaces of the connector 26 and the holders 42 to be bonded together, and can minimize tilting of the optical axes of the slit unit 25 and the lens array 4.

The connector 26 includes a first member 27 and a second member 28. The first member 27 is connected to the light emission surface 46 of the holder 42 facing the light receiver and to a side surface 47 of the holder 42 extending in the main scanning direction. More specifically, the first member 27 includes two plates extending in the main scanning direction connected into an L shape. The two plates may be separate members bonded together or may be an integral member. One of the two plates has a surface connected to the light emission surface 46 of the corresponding holder 42, and the other of the two plates has a surface connected to the side surface 47 of the holder 42.

The second member 28 has the same shape as the first member 27. The second member 28 is connected to the light emission surface 46 of the corresponding holder 42 facing the light receiver and to a side surface 48 opposite to the side surface 47 to which the first member 27 is connected. More specifically, similarly to the first member 27, the second member 28 includes two plates extending in the main scanning direction connected into an L shape. One of the two plates has a surface connected to the light emission surface 46 of the corresponding holder 42, and the other of the two plates has a surface connected to the side surface 48 of the holder 42.

FIG. 16A shows the slit unit 25 from which the connector 26 is removed. FIG. 16B shows the slit unit 25 including the connector 26. The surface of the first member 27 opposite to the surface connected to the light emission surface 46 of the corresponding holder 42 facing the light receiver is disposed on the surface of the slit unit 25 facing the lens array 4. The surface of the second member 28 opposite to the light emission surface 46 of the holder 42 facing the light receiver is disposed on the surface of the slit unit 25 facing the lens array 4. In this structure, the light emission surface 45 of each lens 41 facing the light receiver 7 is not in direct contact with the slit unit 25. This structure eliminates the relief portion 19 on the surface of the slit unit 25 facing the lens array 4.

Figure 18:
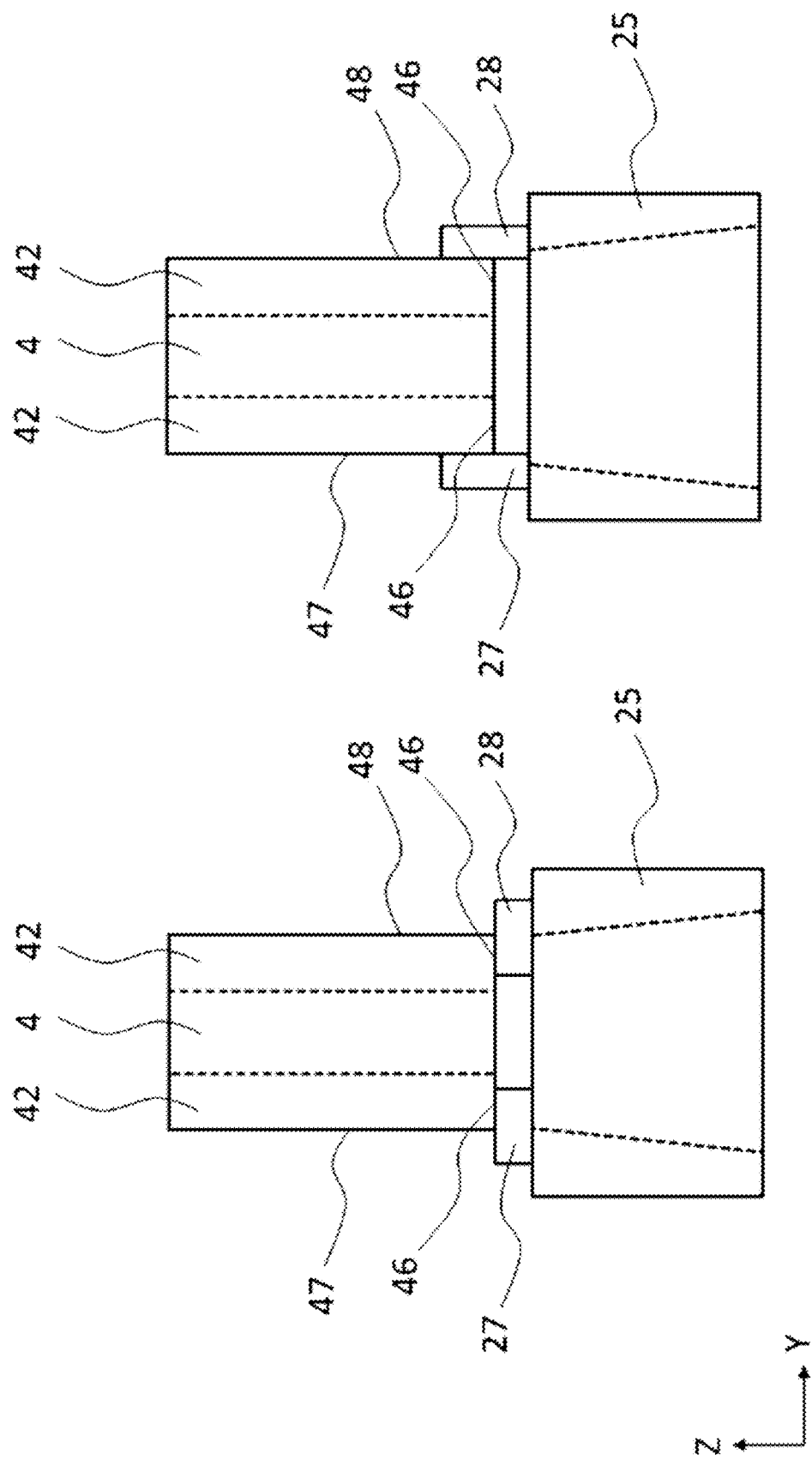
FIG. 18 includes side views of lens arrays in the image reading device according to Embodiment 4 on which slit units with other structures are disposed.

Although FIGS. 16A and 16B show the slit unit 25 without the first protrusions 17 and the recesses 18, the slit unit 25 may include the first protrusions 17 and the recesses 18. Similarly, the slit unit 25 may include the second protrusions 21 and the grooves 22. Although the first member 27 and the second member 28 in the connector 26 are L-shaped, the first member 27 and the second member 28 may have other shapes. FIG. 18 shows connectors 26 in the image reading device 400 according to Embodiment 4 with other structures. As shown in FIG. 18, the connector 26 may have a plate-like first member 27 and a plate-like second member 28. The plate-like first member 27 is connected to either the light emission surface 46 or the side surface 47 of the corresponding holder 42. The plate-like second member 28 is connected to either the light emission surface 46 or the side surface 48 of the corresponding holder 42.

The slit unit 25 including the connector 26 can be connected to the holders 42 when, for example, having a greater length than the lens array 4 and the holders 42 in the sub-scanning direction. The slit unit 25 of the same size can be easily connected to the lens arrays 4 having different lengths in the sub-scanning direction. When the through-holes 16 have a greater length than the lenses 41 in the sub-scanning direction, the connector 26 partially disposed on the surfaces of the light shielding plates 14 facing the lens array 4 can narrow the entrances of the through-holes 16. The connector 26 including the L-shaped first member 27 and second member 28 can be easily positioned when connected to the holders 42.

The image reading device 400 according to Embodiment 4 can also reduce flares. The multiple slit units 25 are arranged in the main scanning direction such that each two adjacent slit units 25 are arranged with a space therebetween for one optical path of one lens 41. When a single slit unit extends across in the main scanning direction instead of the multiple slit units, tolerance accumulates and may cause a pitch difference between the light shielding plates 14 and the lenses 41. The light shielding plates 14 may thus be shifted inward over the lens 41 at the end portion. In such a case, the light shielding plates 14 shifted inward over the lens may cause more stray light, and thus more flares. In contrast, multiple separate slit units can each accommodate the pitch difference and reduce the shifts of the light shielding plates 14 inward over the lenses. The separate slit units (light shields) allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 14 resulting from collisions and stray light resulting from tilting of the light shielding plates 14, thus reducing flares.

The side plates 15 are eliminated from between each two adjacent slit units 25. Thus, any flare in the sub-scanning direction between one slit unit 25 and another slit unit 25 adjacent to the one slit unit 25 escapes toward the frame 1 and can be less visible during image capturing. Additionally, the slit units 25 with a shorter length facilitate manufacturing processes such as injection molding or stamping. The surface of the lens array 4 facing the light receiver 7 is ground into a flat surface, and the center axes of the through-holes 16 in each slit unit 25 connected to the surface facing the light receiver 7 are perpendicular to the surface facing the light receiver 7. This structure can easily reduce misalignment of the center axes of the through-holes 16 in each slit unit 25 with the optical axes of the lenses 41. The slit units 25 on the flat surface reduce tilting of the light shielding plates 14 more than the slit units 25 on convex lenses.

The slit units 25 with uneven surfaces resulting from etching with an alkaline or acid solution can reduce reflection from the light shielding plates 14 and the side plates 15, thus reducing flares. The slit units 25 formed from a resin containing a granular filler by injection molding can be manufactured inexpensively.

Embodiment 5

Figure 21:
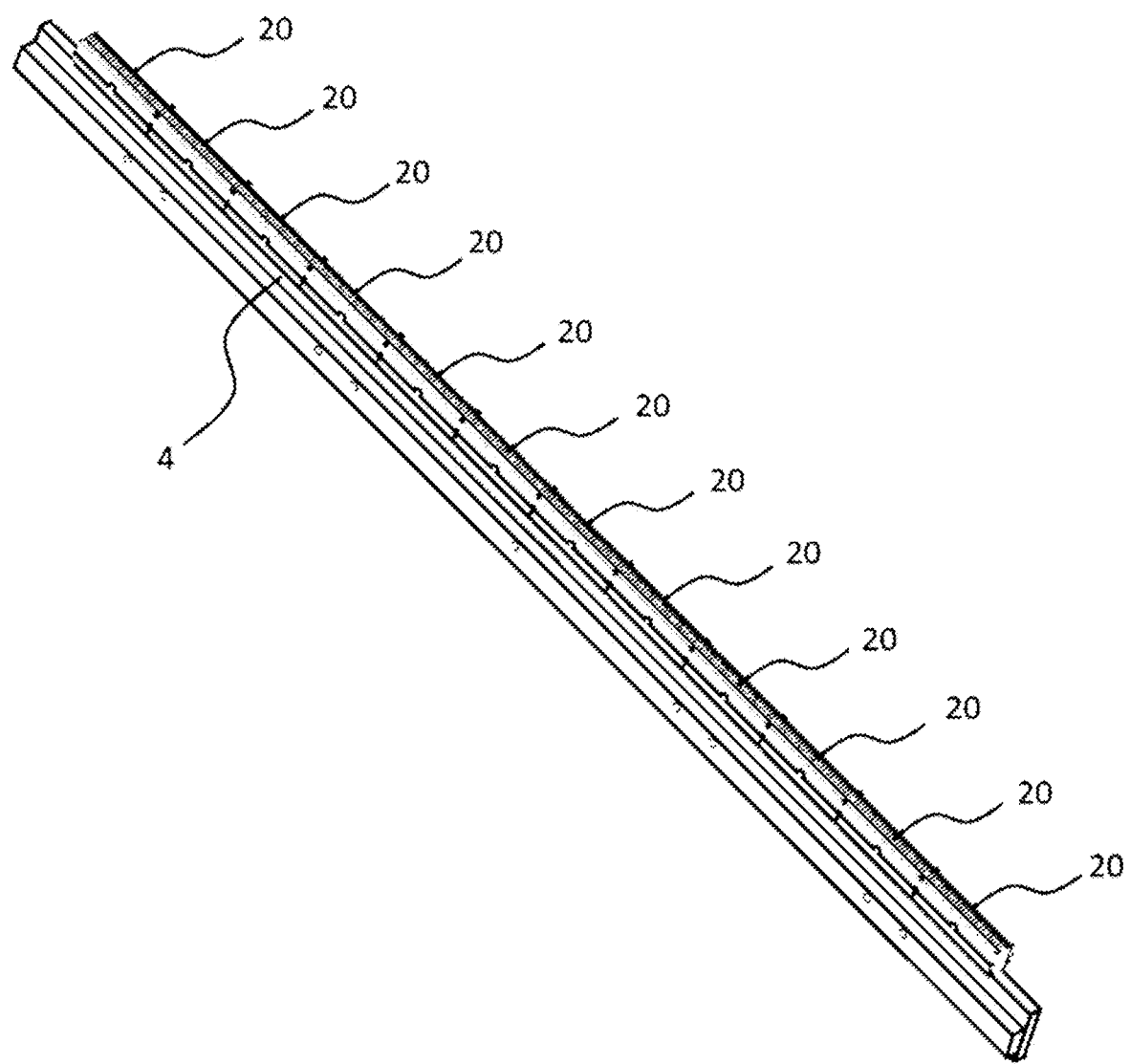
FIG. 21 is a perspective view of a lens array and holders in an image reading device according to Embodiment 5.
Figure 22:
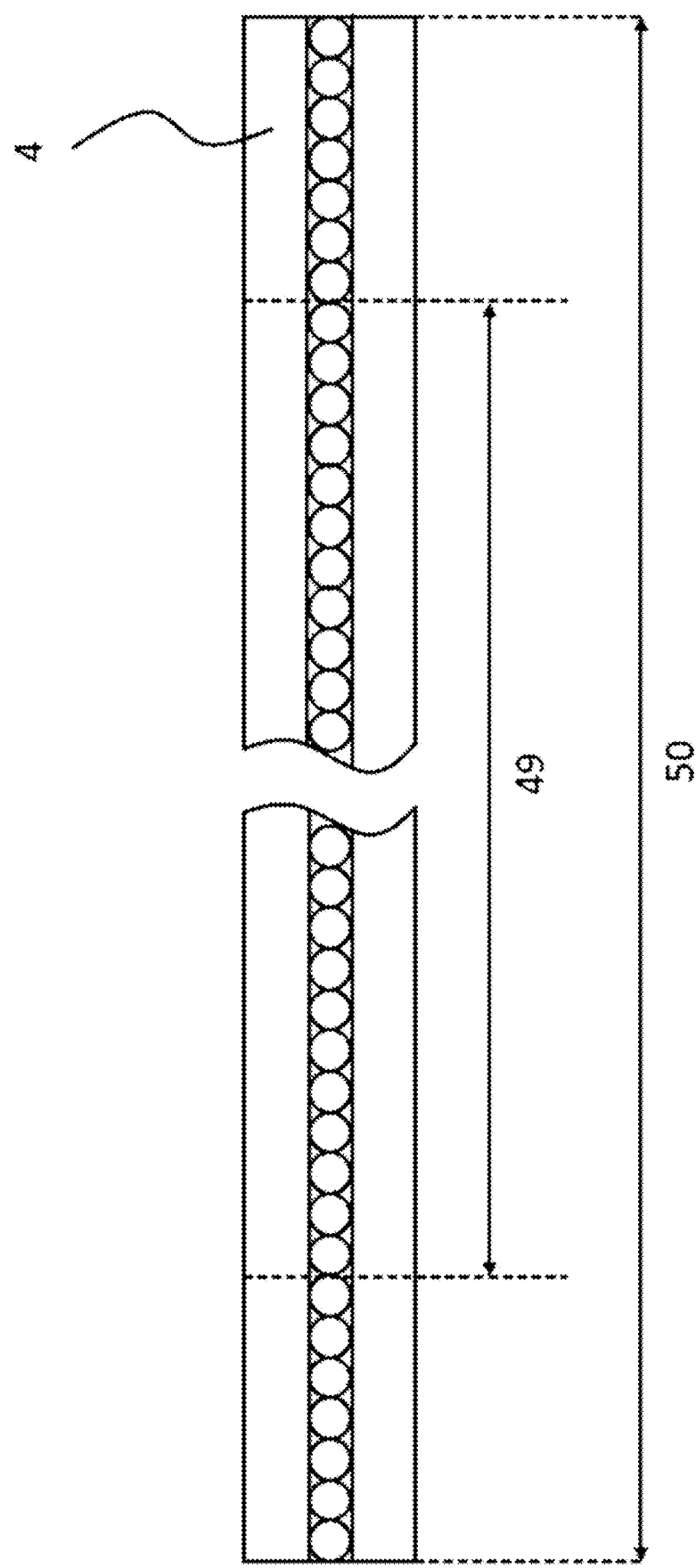
FIG. 22 is a diagram of the lens array showing an effective readable range in the image reading device according to Embodiment 5.
Figure 23:
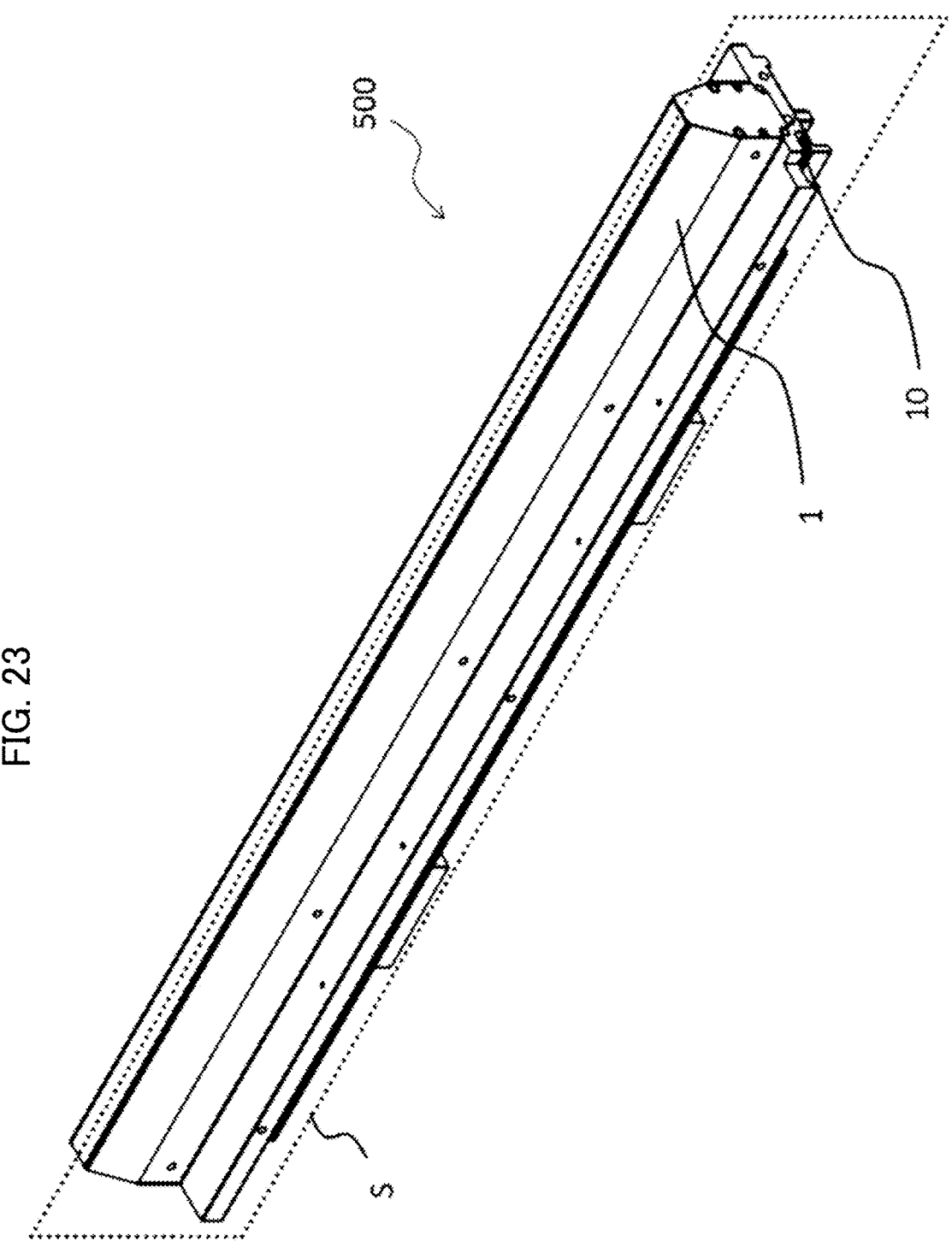
FIG. 23 is a perspective view of the image reading device according to Embodiment 5.

An image reading device 500 according to Embodiment 5 is described below with reference to the drawings. In the drawings, the same reference signs denote the same or corresponding components, and such components are not described in detail. FIG. 21 is a perspective view of a lens array 4 and holders 42 in the image reading device 500. Although the structure shown in FIG. 21 includes the slit units 20 in Embodiment 2 as the slit units, the structure may include the slit units 6, 23, or 25. FIG. 22 is a diagram of the lens array 4 showing an effective readable range 49. FIG. 23 is a perspective view of the image reading device 500. The image reading device 500 according to Embodiment 5 has the same structure as the image reading device 100, 200, 300, or 400 except for light shields 60 further included in the lens array 4. The other components are substantially the same as the components in the other embodiments. The same reference signs denote the same or corresponding components described in the above embodiments, and such components are not described repeatedly.

Figure 24:
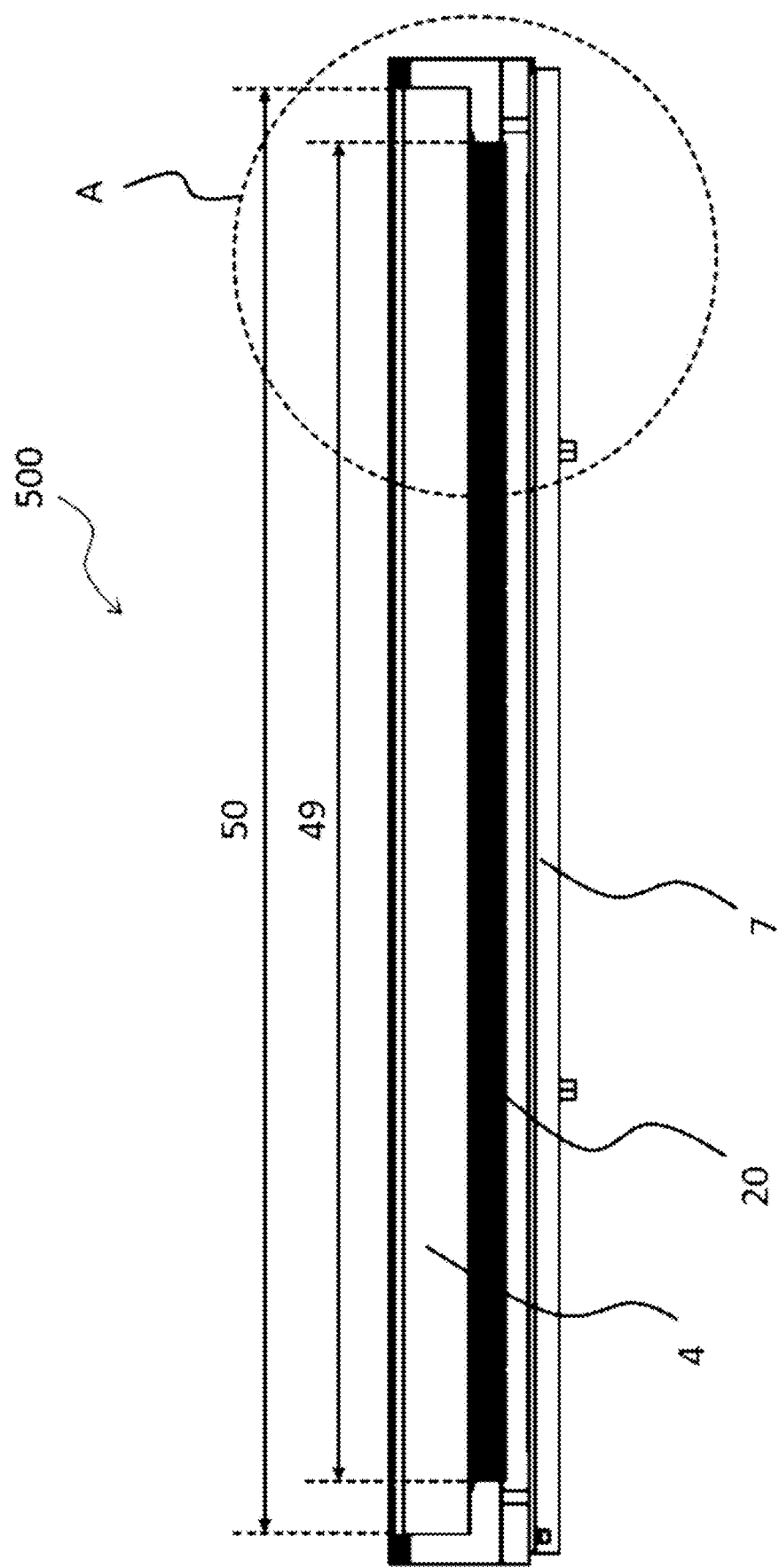
FIG. 24 is a cross-sectional side view of the image reading device according to Embodiment 5.
Figure 25:
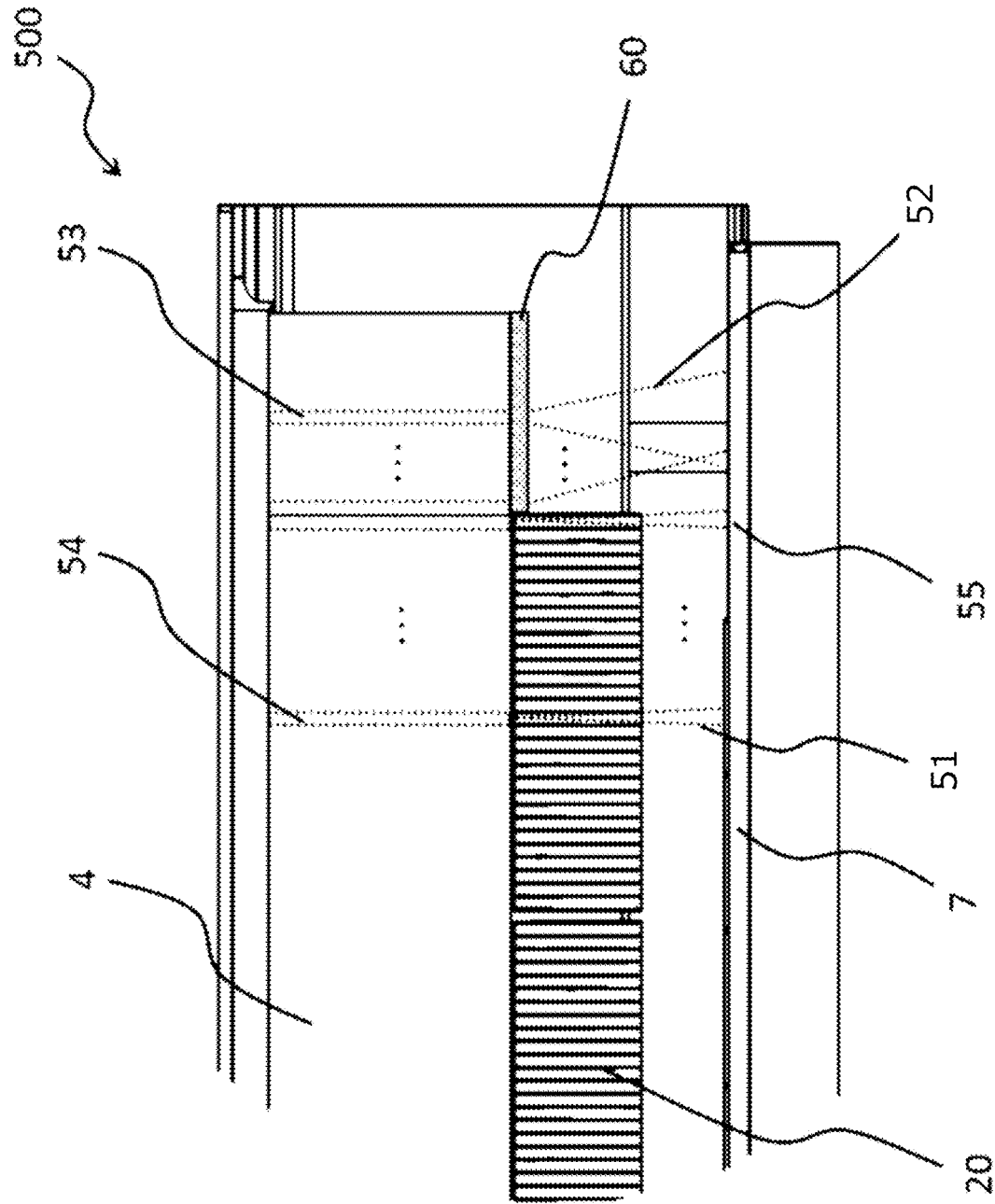
FIG. 25 is an enlarged view of the image reading device according to Embodiment 5.
Figure 26:
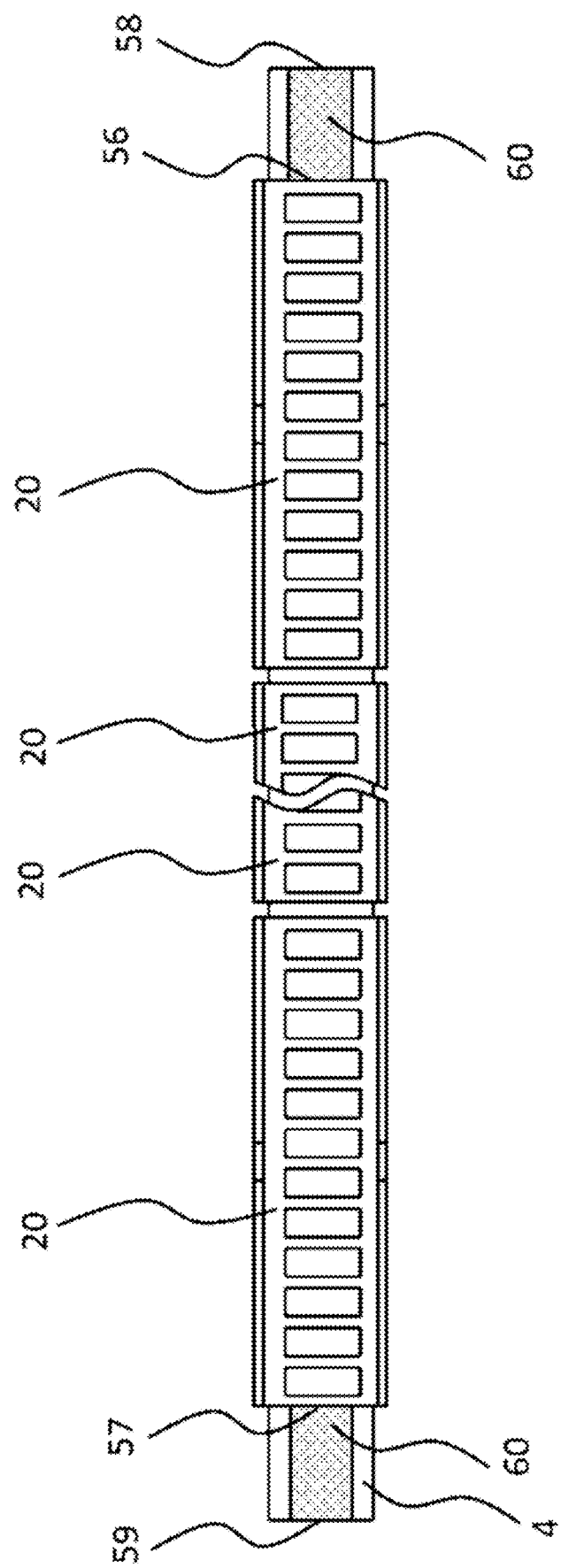
FIG. 26 is a plan view of the lens array in the image reading device according to Embodiment 5 on which slit units are disposed, as viewed from a sensor in the read depth direction.

As shown in FIG. 21, the slit units 20 are arranged on the lens array 4 in the main scanning direction. As shown in FIG. 22, the lens array 4 has the effective readable range 49. The effective readable range 49 is shorter than a lens array entire length 50 of the lens array 4 in the main scanning direction. FIG. 24 is a cross-sectional side view of the image reading device 500 taken along a dotted line S shown in FIG. 23. FIG. 25 is an enlarged view of dotted-line portion A shown in FIG. 24. FIG. 26 is a plan view of the lens array 4 in the image reading device 500 on which the slit units 20 are disposed, as viewed from the light receiver 7 in the read depth direction. As shown in FIGS. 25 and 26, the slit units 20 are arranged within the effective readable range 49 of the lens array 4 by a length reflecting viewing angle restriction of the slit units 20. In other words, the length of the slit units 20 arranged in the main scanning direction between the light shielding plate 14 (a start-point light shielding plate 56) at one end portion and the light shielding plate 14 (an end-point light shielding plate 57) at the other end portion is shorter than the lens array entire length 50 of the lens array 4 in the main scanning direction.

As shown in FIGS. 25 and 26, a light shield 60 is disposed on the surface of the lens array 4 facing the light receiver in a portion between the light shielding plate 14 (the start-point light shielding plate 56) at one end portion of the arranged slit units 20 and one end of the lens array 4 (a lens-array end surface 58). A light shield 60 is also disposed on the surface of the lens array 4 facing the light receiver in a portion between the light shielding plate 14 (the end-point light shielding plate 57) at the other end portion of the arranged slit units 20 and the other end of the lens array 4 (a lens-array end surface 59). In this example, the light shields 60 are formed from black tape or a black potting material.

For the lens array 4 without the light shields 60, as shown in FIG. 25, the viewing angle of outgoing light 52 from a lens 53 without a light shielding plate 14 is unrestricted, and the light is absorbed by a light shielding plate 14. Thus, the outgoing light 52 incident on the light receiver 7 is more intense than outgoing light 51 from a lens 54 with the light shielding plate 14. In particular, intense light is applied to a slit mount end portion 55 of the light receiver 7 facing the start-point light shielding plate 56 or the end-point light shielding plate 57 of the slit unit 20 and appears as a flare. The image reading device 500 including the light shields 60 can block light from the lens 53 in the lens array 4 without light shielding plates 14 from entering the light receiver 7, thus reducing flares. Compared with the slit units 20 being arranged on both ends of the lens array 4, this structure can reduce the costs for components in the slit units 20 and the processing costs.

The image reading device 500 according to Embodiment 5 can also reduce flares. The multiple slit units 20 are arranged in the main scanning direction such that each two adjacent slit units 20 are arranged with a space therebetween for one optical path of one lens 41. When a single slit unit extends across in the main scanning direction instead of the multiple slit units, tolerance accumulates and may cause a pitch difference between the light shielding plates 14 and the lenses 41. The light shielding plates 14 may thus be shifted inward over the lens 41 at the end portion. In such a case, the light shielding plates 14 shifted inward over the lens may cause more stray light, and thus more flares. In contrast, multiple separate slit units can each accommodate the pitch difference and reduce shifts of the light shielding plates 14 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 14 resulting from collisions and stray light resulting from tilting of the light shielding plates 14, thus reducing flares.

The side plates 15 are eliminated from between each two adjacent slit units 20. Thus, any flare in the sub-scanning direction between one slit unit 20 and another slit unit 20 adjacent to the one slit unit 20 escapes toward the frame 1 and can be less visible during image capturing. Additionally, the slit units 20 with a shorter length facilitate manufacturing processes such as injection molding or stamping. The surface of the lens array 4 facing the light receiver 7 is ground into a flat surface, and the center axes of the through-holes 16 in each slit unit 20 connected to the surface facing the light receiver 7 are perpendicular to the surface facing the light receiver 7. This structure can easily reduce misalignment of the center axes of the through-holes 16 in each slit unit 20 with the optical axes of the lenses 41. The slit units 20 on the flat surface reduce tilting of the light shielding plates 14 more than the slit unit 20 on convex lenses.

The slit units 20 with uneven surfaces resulting from etching with an alkaline or acid solution can reduce reflection from the light shielding plates 14 and the side plates 15, thus reducing flares. The slit units 20 formed from a resin containing a granular filler by injection molding thus be manufactured inexpensively.

The light shields 60 block light from the lens 53 in the lens array 4 without a light shielding plate 14 from entering the light receiver 7. This structure can thus reduce flares.

Embodiment 6

Figure 29:
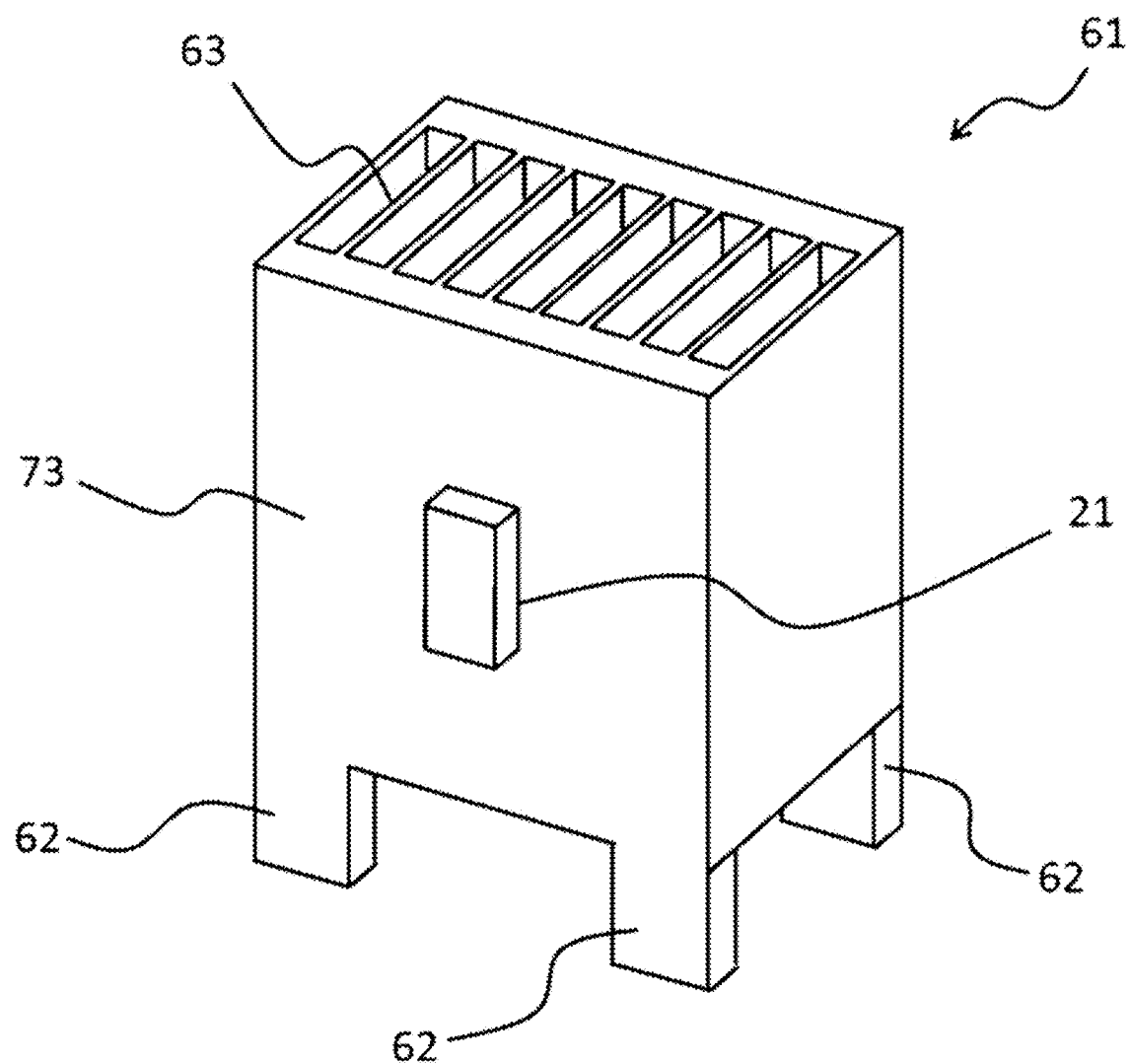
FIG. 29 is a perspective view of a slit unit in an image reading device according to Embodiment 6.
Figure 30:
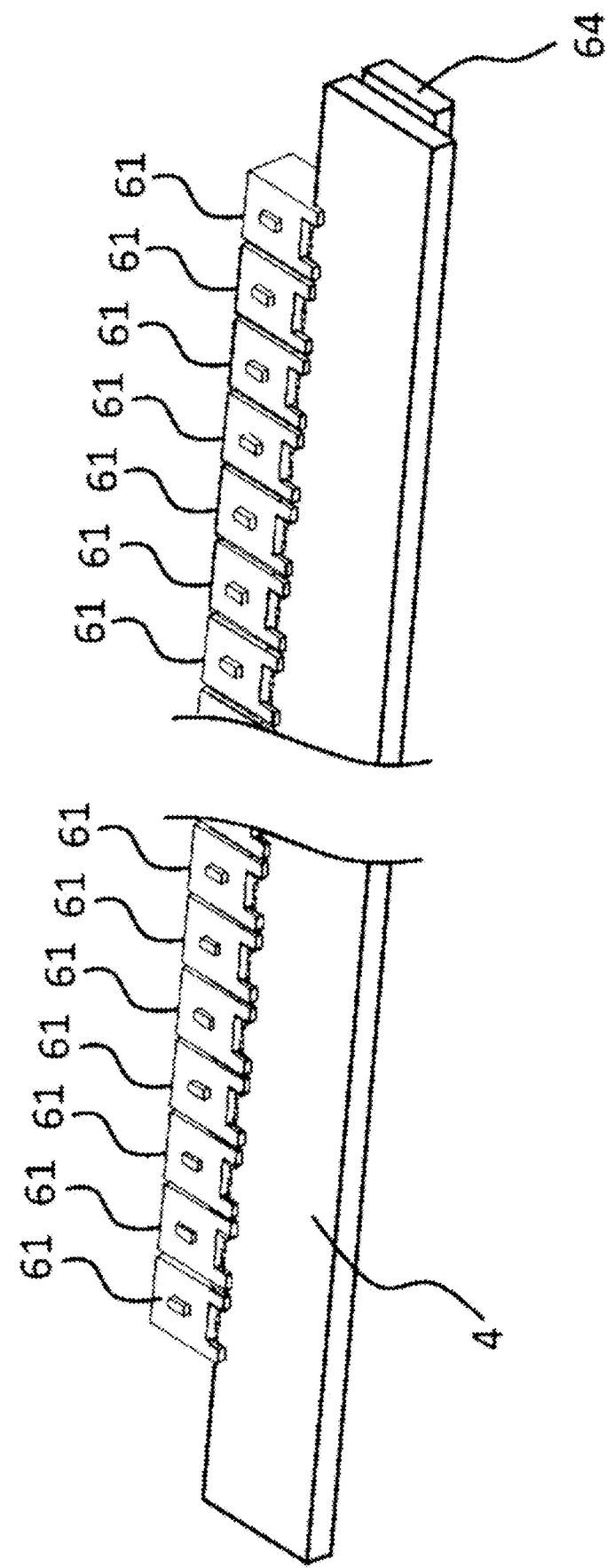
FIG. 30 is a perspective view of a lens array and holders in the image reading device according to Embodiment 6 on which the slit units are disposed.
Figure 31:
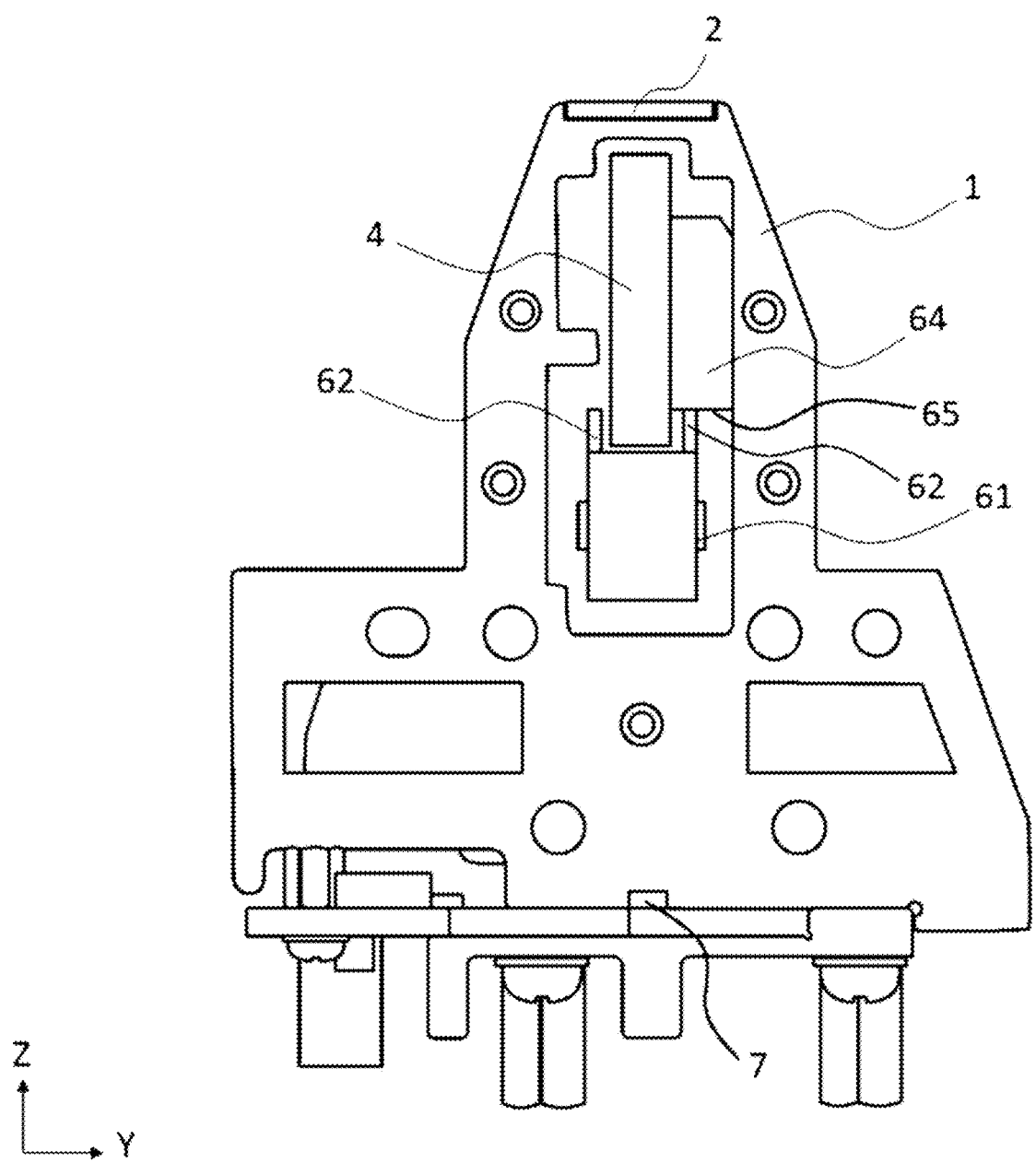
FIG. 31 is a side view of the image reading device according to Embodiment 6 from which a frame side plate is removed, as viewed in the main scanning direction.

An image reading device 600 according to Embodiment 6 is described below with reference to the drawings. In the drawings, the same reference signs denote the same or corresponding components, and such components are not described in detail. FIG. 29 is a perspective view of a slit unit 61 in the image reading device 600 according to Embodiment 6. FIG. 30 is a perspective view of a lens array 4 and holders 42 in the image reading device 600 according to Embodiment 6 on which the slit units 61 are disposed. FIG. 31 is a side view of the image reading device 600 according to Embodiment 6 from which a frame side plate is removed, as viewed in the main scanning direction. The image reading device 600 according to Embodiment 6 differs from the image reading devices 100 to 400 in the structures of the slit units 6, 20, 23, and 25 and differs from the image reading devices 100 to 500 in the structure of the retainer plate 5. The other components are substantially the same as the components in the other embodiments. The same reference signs denote the same or corresponding components described in the above embodiments, and such components are not described repeatedly.

Instead of the retainer plate 5, the image reading device 600 includes a retainer plate 64. The surface of the retainer plate 64 facing the light receiver 7 is a contact surface 65 processed to be flat. In this example, the contact surface 65 is more distant from the light receiver 7 in the read depth direction than the light emission surface 45 of the lens array 4 facing the light receiver 7 and the light emission surfaces 46 of the holders 42 facing the light receiver 7. The contact surface 65 may be at the same position as the light emission surface 45 of the lens array 4 facing the light receiver 7 and the light emission surfaces 46 of the holders 42 facing the light receiver 7 in the read depth direction. The retainer plate 64 is disposed on one of the side surfaces of the holders 42 extending in the main scanning direction. The retainer plate 64 is fastened to the frame 1 with a fastener such as a screw.

The image reading device 600 includes the multiple slit units 61 between the lens array 4 and the light receiver 7. The slit units 61 are arranged in the main scanning direction. The slit units 61 each include light shielding plates 63 and side plates 73. More specifically, each of the slit units 61 includes three or more light shielding plates 63 that are adjacent and are connected with the side plates 73. As shown in FIG. 29, each slit unit 61 includes reference protrusions 62 on the surface of each of the side plates 73 facing the lens array 4 and on both ends in the direction intersecting the main scanning direction to protrude toward the lens array 4. In other words, two of the reference protrusions 62 are disposed on the surface of a first side plate 73 facing the lens array 4 at the two ends of the side plate 73 as viewed in a direction intersecting the main scanning direction. Other two of the reference protrusions 62 are also disposed on the surface of a second side plate 73 facing the lens array 4 at the two ends as viewed in a direction intersecting the main scanning direction. Thus, the four reference protrusions 62 are disposed on the surfaces of each slit unit 61 facing the lens array 4. In this example, the light shielding plates 63, the side plates 73, and the reference protrusions 62 are integral with one another. The length between the side plates 73 is greater than the length of the lens array 4 in the direction intersecting the main scanning direction. At least one of the reference protrusions 62 is more distant from the light receiver 7 in the read depth direction than the light emission surface 45 of the lens array 4 facing the light receiver 7 and the light emission surfaces 46 of the holders 42 facing the light receiver 7. Thus, the reference protrusions 62 are disposed on both sides of the lens array 4 in the direction intersecting the main scanning direction. In other words, the lens array 4 is disposed between the reference protrusions 62 on one of the side plates 73 and the reference protrusions 62 on the other side plate 73 in the direction intersecting the main scanning direction. Each slit unit 61 may further include the first protrusions 17 and the recesses 18 similarly to the slit units 6, or the second protrusions 21 and the grooves 22 similarly to the slit unit 20. FIG. 29 shows the slit unit 61 including the second protrusions 21. Other components in the slit unit 61 are substantially the same as the components in the other embodiments.

Each of the reference protrusions 62 disposed on the first side plate 73 is in contact with, on a surface thereof opposite to the light receiver 7, the surface (the contact surface 65) of the retainer plate 64 facing the light receiver 7. In other words, the slit units 61 are in contact with the contact surface 65 of the retainer plate 64 facing the light receiver 7. Thus, even when the slit units 61 are not in contact with the light emission surface 45 of the lens array 4 facing the light receiver 7, the slit units 61 can be positioned in the read depth direction with respect to the lens array 4 connected to the retainer plate 64. In this example, the portion in which each slit unit 61 and the retainer plate 64 are in contact with each other is not fixed with, for example, an adhesive. When the slit units 61 are fixed to the retainer plate 64 that continuously extend in the main scanning direction, thermal expansion of the adhesive may change the relative positional relation between the rod lenses 41 in the lens array 4 and the light shielding plates 63 in the slit units 61. This is to be avoided. As described above, a change in the relative positional relation between the rod lenses 41 in the lens array 4 and the light shielding plates 63 degrades the optical characteristics.

In Embodiment 6, the light incidence surface 43 of the lens array 4 facing the reading target and the light incidence surfaces 44 of the holders 42 facing the reading target may not be flush with each other. Similarly, the light emission surface 45 of the lens array 4 facing the light receiver 7 and the light emission surfaces 46 of the holders 42 facing the light receiver 7 may not be flush with each other. The slit units 61 are not attached to the light emission surfaces 46 of the holders 42 facing the light receiver 7. As described later, the slit units 61 are attached to the side surfaces of the holders 42 extending in the main scanning direction.

Figure 32:
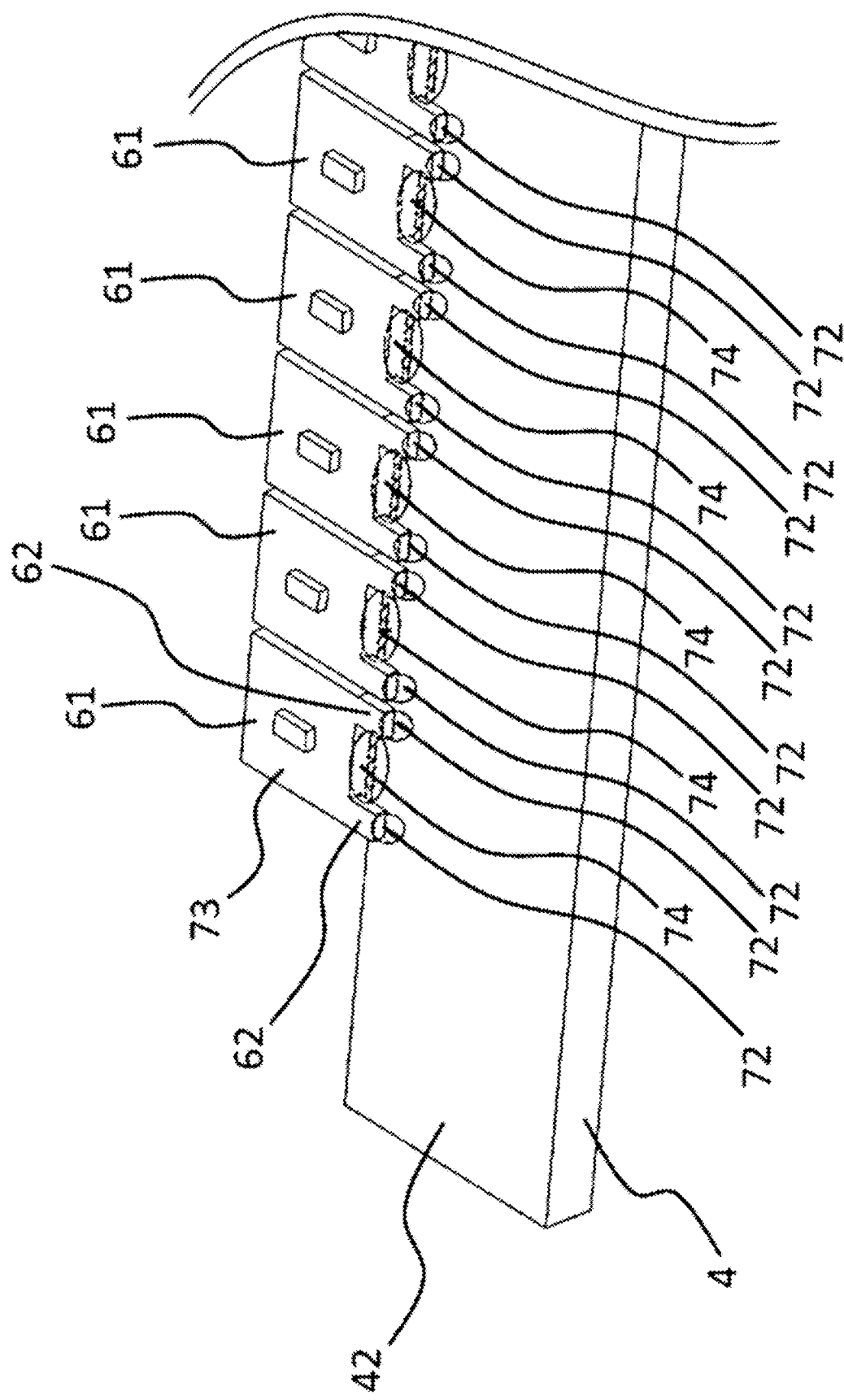
FIG. 32 is an enlarged view of the slit units and the lens array in the image reading device according to Embodiment 6 showing a surface without a retainer plate.
Figure 33:
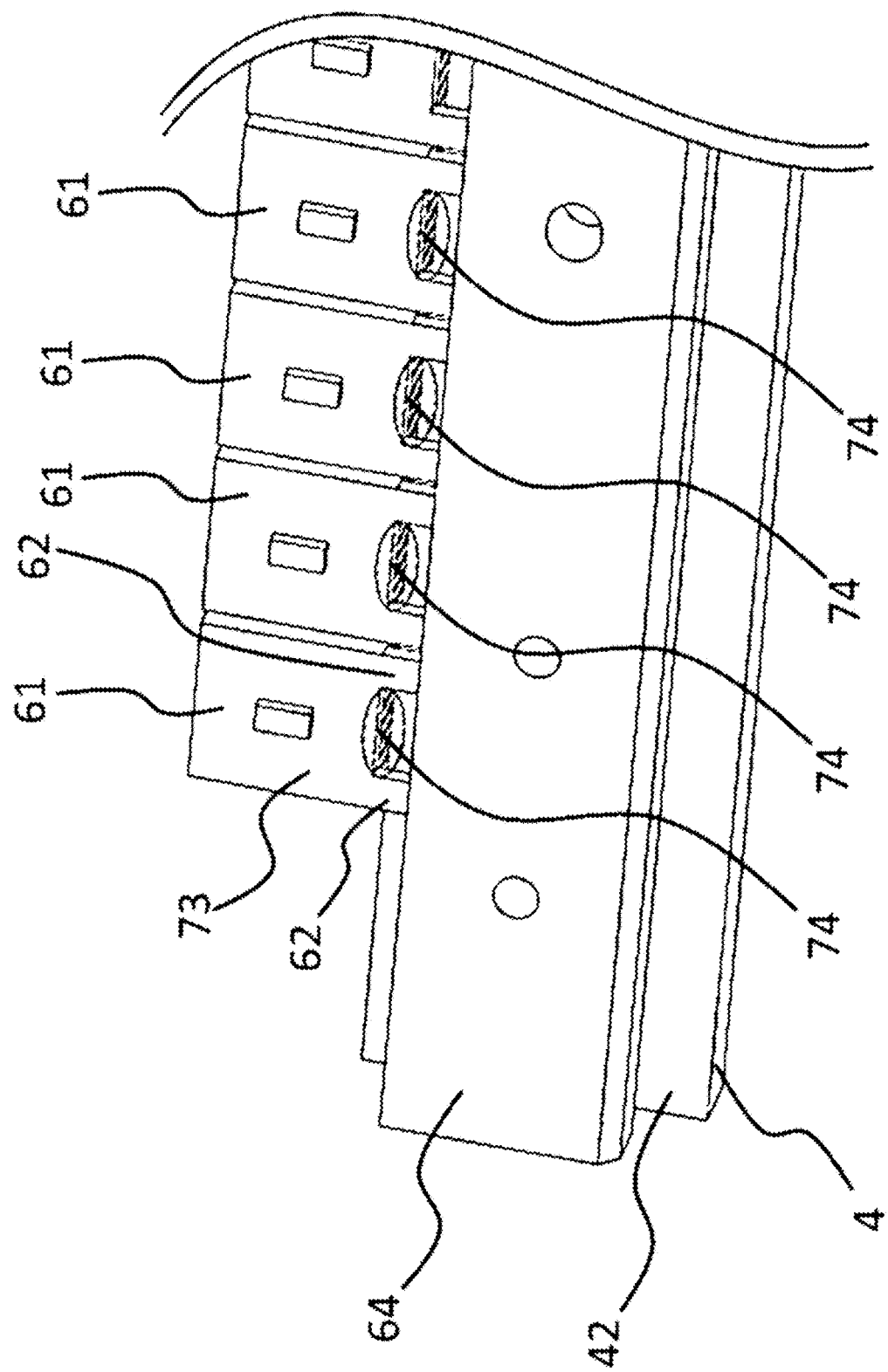
FIG. 33 is an enlarged view of the slit units and the lens array in the image reading device according to Embodiment 6 showing a surface with the retainer plate.
Figure 34:
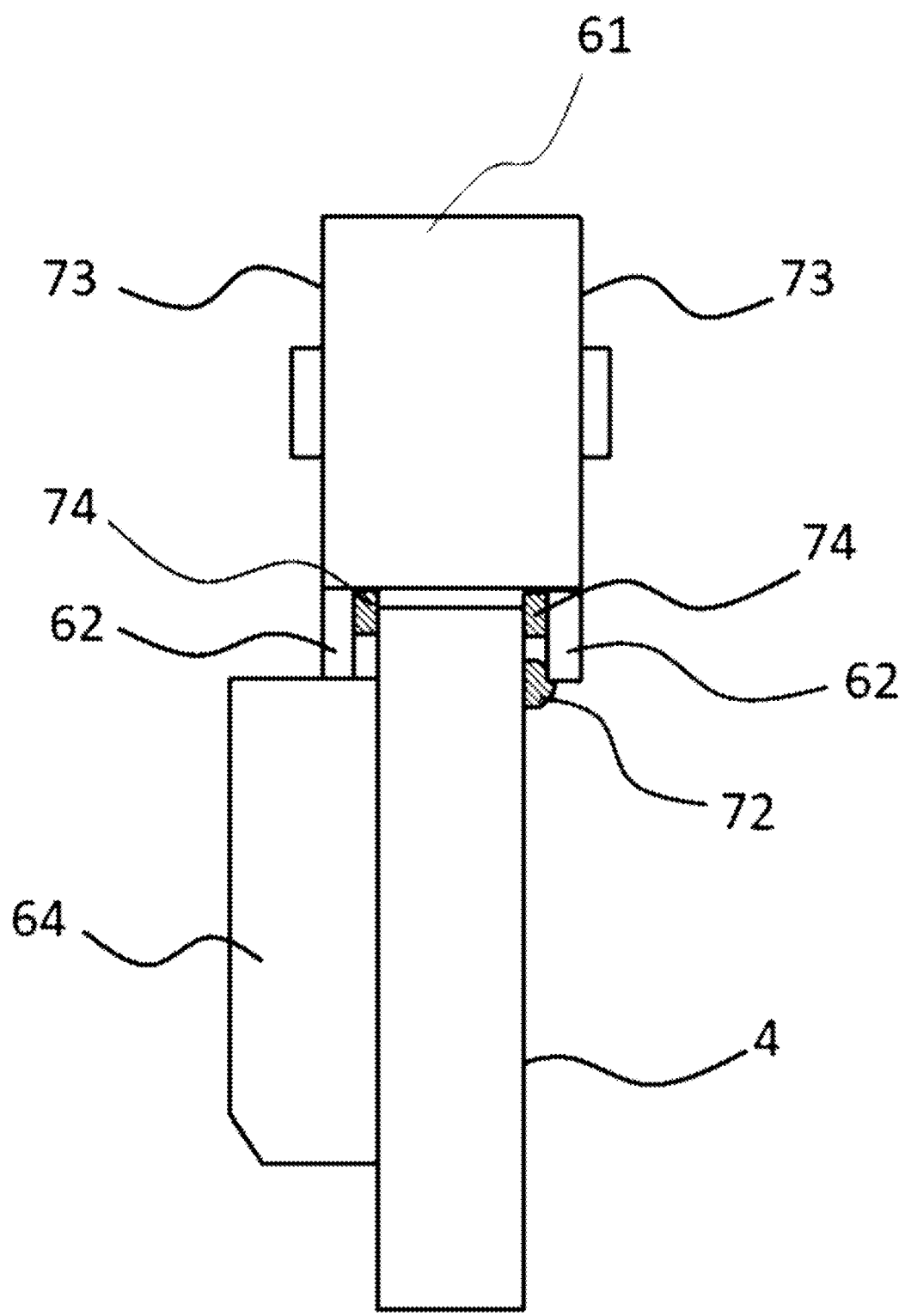
FIG. 34 is a side view of the lens array in the image reading device according to Embodiment 6 on which the slit units and the retainer plate are disposed.

The lens array 4 and the slit units 61 are fixed together with an adhesive. In this example, the adhesive includes a first adhesive 72 and a second adhesive 74. The first adhesive 72 is an acrylic adhesive that cures when receiving ultraviolet rays. The second adhesive 74 takes a longer time to cure than the first adhesive 72. The second adhesive 74 has a higher modulus of elasticity than the first adhesive 72. The second adhesive 74 is a silicone adhesive that cures with humidity. The second adhesive 74 may have substantially the same coefficient of thermal expansion as the holders 42 in the lens array 4. FIG. 32 is an enlarged view of the slit units 61 and the lens array 4 showing the surface without the retainer plate 64 (a view of an example adhesive being applied). FIG. 33 is an enlarged view of the slit units 61 and the lens array 4 showing the surface with the retainer plate 64 (a view of an example adhesive being applied). FIG. 34 is a side view of the lens array 4 on which the slit units 61 and the retainer plate 64 are mounted (a view of an example adhesive being applied). At least one of the reference protrusions 62 is fixed, with the first adhesive 72, to the side surface of the holder 42 extending in the main scanning direction. In this example, the reference protrusions 62 on the second side plate 73 without being in contact with the retainer plate 64 are fixed, with the first adhesive 72, to the side surface of the holder 42 extending in the main scanning direction. More specifically, the surfaces of the reference protrusions 62 on the second side plate 73 and facing the side surface of the holder 42 are fixed to the side surface of the holder 42 with the first adhesive 72. Each of the side plates 73 is fixed, on a portion without a reference protrusion 62 on the surface thereof facing the lens array 4, with the second adhesive 74, to one of the side surfaces of the holder 42 extending in the main scanning direction.

The first adhesive 72 and the second adhesive 74 are applied in the manner described below. As shown in FIG. 32, the first adhesive 72 that cures with ultraviolet rays is first applied to the reference protrusions 62 not in contact with the retainer plate 64 (the reference protrusions 62 on the second side plate 73), and irradiated with ultraviolet rays for curing. The second adhesive 74 that is a silicone adhesive that cures with humidity is then applied to the portion of the holder 42 in the lens array 4 without the retainer plate 64 and without the reference protrusions 62 being bonded with the first adhesive 72, and cured. As shown in FIG. 33, the second adhesive 74 that is a silicone adhesive that cures with humidity is then applied to the surface of the holder 42 in the lens array 4 with the retainer plate 64 and opposing the portion of the surface of each side plate 73 facing the lens array 4 without the reference protrusions 62, and cured. The reference protrusions 62 and the holder 42 in the lens array 4 with the retainer plate 64 may also be fixed together with the first adhesive 72. As shown in FIG. 34, an adhesive is not applied to the contact surface 65 of the retainer plate 64 in contact with the reference protrusions 62 on the slit units 61 with the retainer plate 64.

An ultraviolet curable acrylic adhesive serving as the first adhesive 72 typically causes thermal expansion. The first adhesive 72 has a higher coefficient of thermal expansion than the holders 42 in the lens array 4. Thus, when applied over a long distance in the main scanning direction, the first adhesive 72 may cause detachment between the lens array 4 and the slit units 61 when the ambient temperature changes. However, the structure does not use the first adhesive 72 applied throughout the entire length of the slit units 61 in the main scanning direction, and can thus reduce the likelihood of a change in the relative position relationship of the rod lenses 41 in the lens array 4 and the light shielding plates 63 in the slit units 61 resulting from a linear expansion difference and detachment between the lens array 4 and the slit units 61. The first adhesive 72 can bond the lens array 4 and the slit units 61 together in a short time. Additionally, the second adhesive 74 with a low coefficient of thermal expansion can increase the bonding strength. After being bonded with the first adhesive 72 to be fixed together, the lens array 4 and the slit units 61 are bonded with the second adhesive 74. Thus, the lens array 4 and the slit units 61 can be easily bonded together using the second adhesive 74 that takes time to cure. An ultraviolet curable silicone adhesive may be used instead of an ultraviolet curable acrylic adhesive as the first adhesive 72, although the ultraviolet curable silicone adhesive uses an atmosphere of nitrogen, and not easily curable in the air unless having a small thickness.

Figure 35:
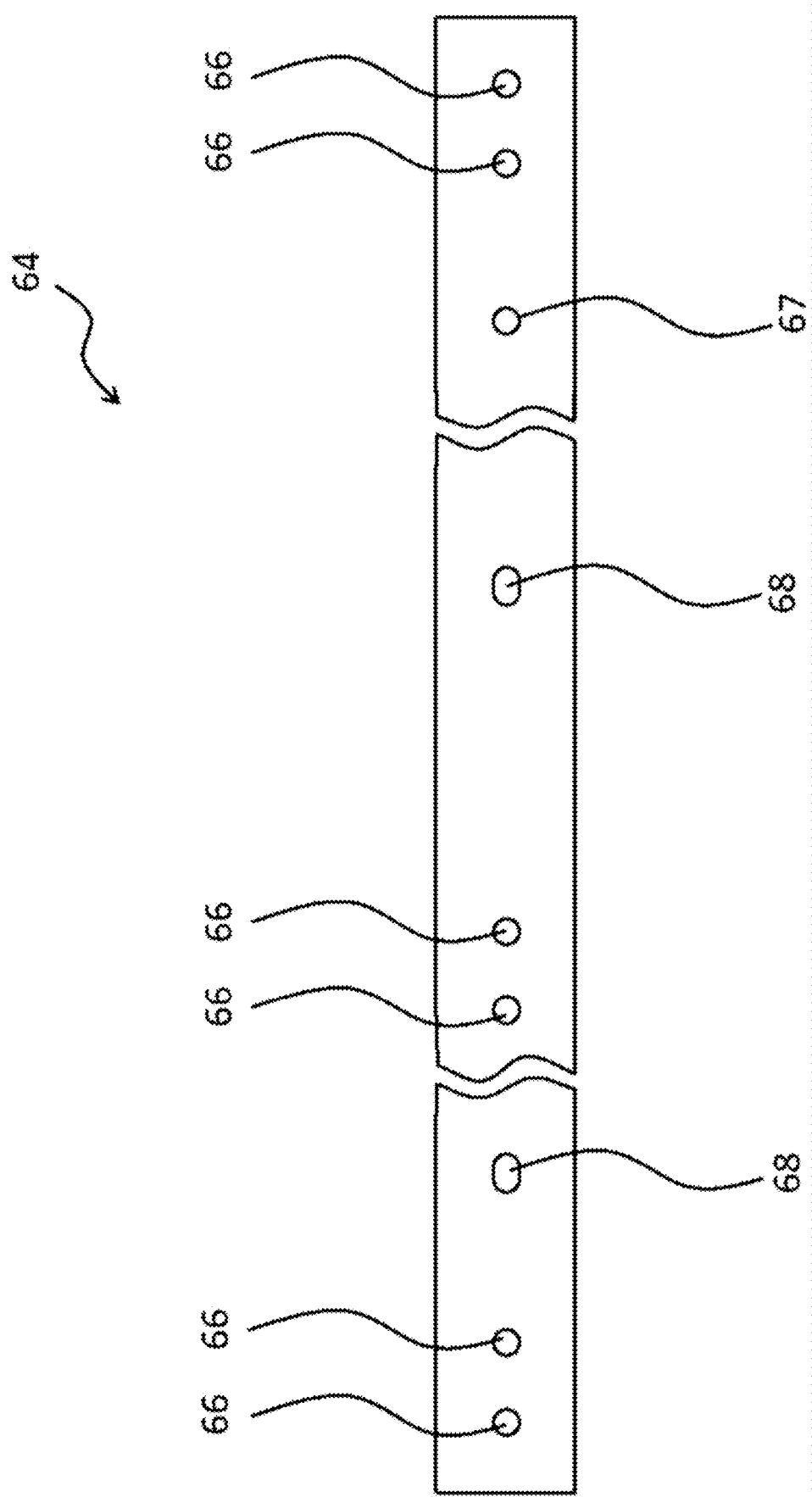
FIG. 35 is a side view of the retainer plate in the image reading device according to Embodiment 6 as viewed in a direction intersecting the main scanning direction.

FIG. 35 is a side view of the retainer plate 64 as viewed in a direction intersecting the main scanning direction. The retainer plate 64 has circular holes and elliptic holes on the side surface extending in the main scanning direction. The circular holes include multiple taps 66 and a fit hole 67 for fastening the retainer plate 64 to the frame 1. The elliptic holes include fit long holes 68. The taps 66 receive fasteners such as screws to fasten the retainer plate 64 and the frame 1 to each other. The retainer plate 64 includes at least one fit hole 67 and at least one fit long hole 68. The fit hole 67 and the fit long holes 68 are used for positioning and reducing warpage of the retainer plate 64 when the retainer plate 64 is attached to the lens array 4 and the slit units 61 are attached to the lens array 4. More specifically, the fit hole 67 in the retainer plate 64 receives a protrusion in a jig used for attachment to allow positioning in the main scanning direction and in the read depth direction. Additionally, the fit long holes 68 receive the protrusion in the jig to position the retainer plate 64 in the read depth direction. This structure can also reduce warpage of the retainer plate 64. When the taps 66 are not used, such as when a screw is not used to fasten the retainer plate 64 to the frame 1, the retainer plate 64 may have the fit hole 67 and the fit long holes 68 alone.

The reference protrusions 62 on each slit unit 61 are in contact with the contact surface 65 of the retainer plate 64. Thus, the lens array 4 and the retainer plate 64 are to be bonded parallel to each other to avoid tilting of the slit unit 61 in contact with the contact surface 65. When the lens array 4 and the retainer plate 64 are not bonded in parallel, the slit unit 61 is fixed to the lens array 4 in a tilted manner. Any warpage of the retainer plate 64 can also cause tilting with respect to the lens array 4 when the retainer plate 64 is attached to a jig used to assemble the image reading device 600. The retainer plate 64 having the circular holes and the elliptic holes can reduce tilting of the retainer plate 64 with respect to the holder 42 in the lens array 4 during attachment, and tilting of the slit unit 61 with respect to the retainer plate 64 during attachment. Thus, the light shielding plate 63 in the slit units 61 can be easily assembled parallel to the optical axis of the rod lenses 41 in the lens array 4, thus reducing flares.

The reference protrusions 62 on each slit unit 61 are in contact with the contact surface 65 of the retainer plate 64. Thus, the lens array 4 and the retainer plate 64 are to be bonded parallel to each other to avoid tilting of the slit unit 61 in contact with the contact surface 65. When the lens array 4 and the retainer plate 64 are not bonded in parallel, the slit unit 61 is fixed to the lens array 4 in a tilted manner. Any warpage of the retainer plate 64 can also cause tilting with respect to the lens array 4 when the retainer plate 64 is attached to a jig used to assemble the image reading device 600. The retainer plate 64 having the circular holes and the elliptic holes can reduce tilting of the lens retainer plate 64 with respect to the holder 42 in the lens array 4 during attachment, and tilting of the slit unit 61 with respect to the lens retainer plate 64 during attachment. Thus, the light shielding plate 63 in the slit units 61 can be easily assembled parallel to the optical axis of the rod lenses 41 in the lens array 4, thus reducing flares.

The image reading device 600 according to Embodiment 6 can also reduce flares. The multiple slit units 61 are arranged in the main scanning direction such that each two adjacent slit unit 61 are arranged with a space therebetween for one optical path of one lens 41. When a single slit unit extends across in the main scanning direction instead of the multiple slit units, tolerance accumulates and may cause a pitch difference between the light shielding plates 63 and the lenses 41. The light shielding plates 63 may thus be shifted inward over the lens 41 at the end portion. In such a case, the light shielding plates 63 may cause more stray light, and thus more flares. In contrast, multiple separate slit units can each accommodate the pitch difference and reduce the shifts of the light shielding plates 63 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 63 resulting from collisions and stray light resulting from tilting of the light shielding plates 63, thus reducing flares.

The side plates 73 are eliminated from between each two adjacent slit units 61. Thus, any flare in the sub-scanning direction between one slit unit 61 and another slit unit 61 adjacent to the one slit unit 61 escapes toward the frame 1 and can be less visible during image capturing. Additionally, the slit units 61 with a shorter length facilitate manufacturing processes such as injection molding or stamping. The slit units 61 are not attached to the light emission surface 46 of the holder 42 facing the light receiver 7. Thus, the surface of the lens array 4 facing the light receiver 7 may not be ground into a flat surface. The slit units 61 reduce tilting of the light shielding plates 63 more than when disposed on convex lenses. This structure can easily reduce deformation of the slit units 61.

The slit units 61 with uneven surfaces resulting from etching with an alkaline or acid solution can reduce reflection from the light shielding plates 63 and the side plates 73, thus reducing flares. The slit units 61 formed from a resin containing a granular filler by injection molding can thus be manufactured inexpensively.

Even when the slit units 61 are not in contact with the light emission surface 45 of the lens array 4 facing the light receiver 7, the slit units 61 can be positioned in the read depth direction with respect to the lens array 4 connected to the retainer plate 64. This structure does not use the first adhesive 72 applied throughout the entire length of the slit units 61 in the main scanning direction, and can thus reduce the likelihood of a change in the relative positional relationship of the rod lenses 41 in the lens array 4 and the light shielding plates 63 in the slit units 61 resulting from a linear expansion difference and detachment between the lens array 4 and the slit units 61. The lens array 4 and the slit units 61 can be bonded together in a short time. Additionally, the second adhesive 74 with a low coefficient of thermal expansion can increase the bonding strength. The retainer plate 64 has the circular holes and the elliptic holes. Thus, the light shielding plates 63 in the slit units 61 can be easily attached parallel to the optical axis of the rod lenses 41 in the lens array 4, thus reducing flares.

Embodiment 7

Figure 36:
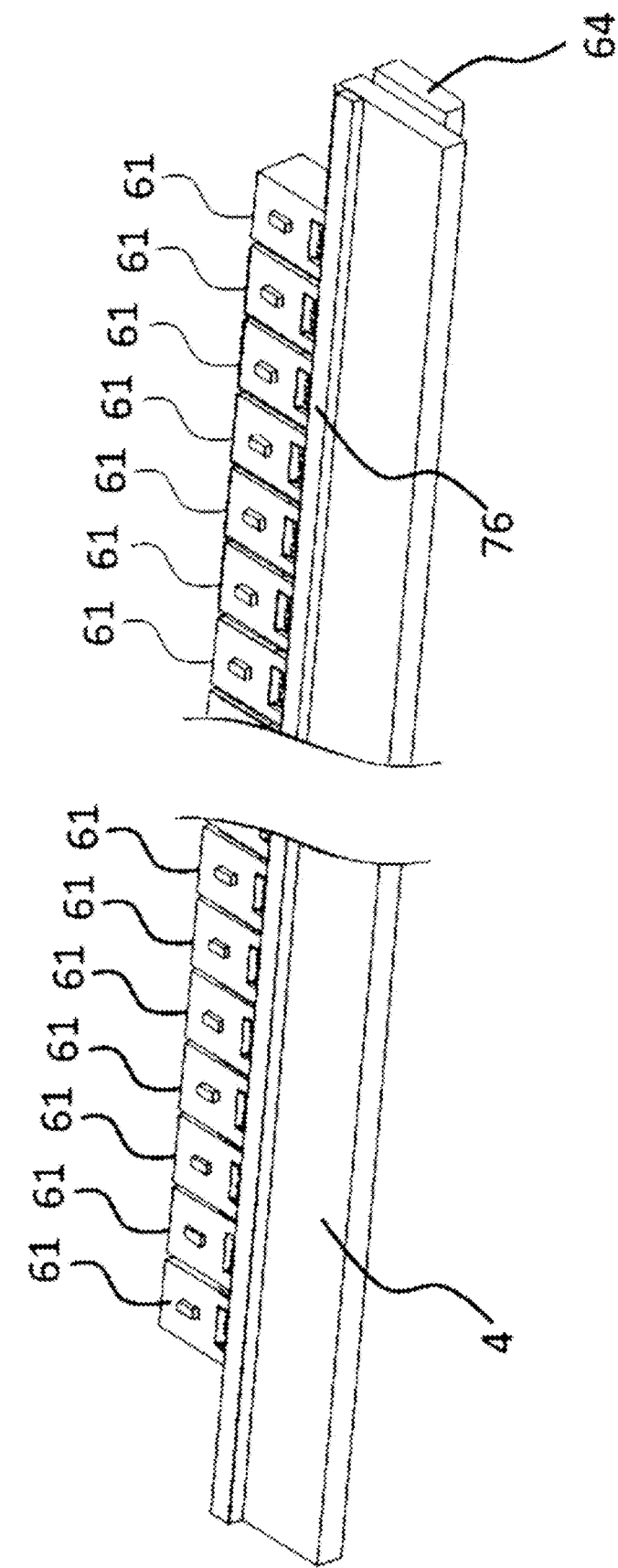
FIG. 36 is a perspective view of a holder and a lens array in an image reading device according to Embodiment 7 on which slit units are disposed.
Figure 37:
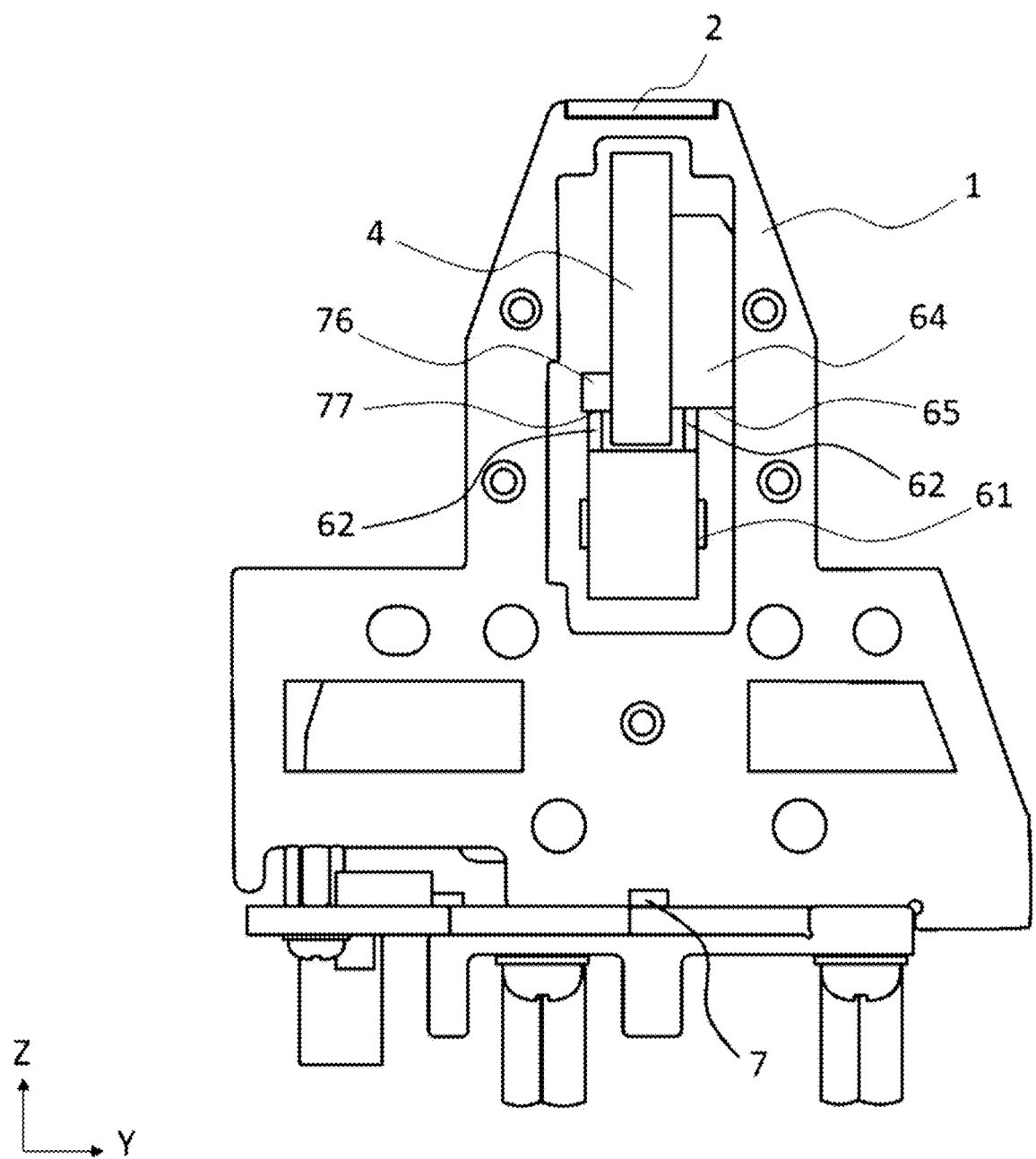
FIG. 37 is a side view of the image reading device according to Embodiment 7 from which a frame side plate is removed, as viewed in the main scanning direction.

An image reading device 700 according to Embodiment 7 is described below with reference to the drawings. In the drawings, the same reference signs denote the same or corresponding components, and such components are not described in detail. FIG. 36 is a perspective view of a lens array 4 and holders 42 in the image reading device 700 according to Embodiment 7 on which the slit units 61 are disposed. FIG. 37 is a side view of the image reading device 700 according to Embodiment 7 from which a frame side plate is removed, as viewed in the main scanning direction. The image reading device 700 according to Embodiment 7 has the same structure as the image reading device 600 except for further including a reference plate 76. The other components are the substantially same as the components in the other embodiments. The same reference signs denote the same or corresponding components described in the above embodiments, and such components are not described repeatedly.

The image reading device 700 includes the reference plate 76 disposed on a side surface of one of the holders 42 extending in the main scanning direction that is opposite to the side surface with the retainer plate 64. The surface of the reference plate 76 facing the light receiver 7 serves as a contact surface 77 processed to be flat. In this example, the contact surface 77 is more distant from the light receiver 7 in the read depth direction than the light emission surface 45 of the lens array 4 facing the light receiver 7 and the light emission surfaces 46 of the holders 42 facing the light receiver 7. The contact surface 77 may be at the same position as the light emission surface 45 of the lens array 4 facing the light receiver 7 and the light emission surfaces 46 of the holders 42 facing the light receiver 7 in the read depth direction. Each of the reference protrusions 62 disposed on the second side plate 73 not in contact with the retainer plate 64 is in contact with, on a surface thereof opposite to the light receiver 7, the surface of the reference plate 76 facing the light receiver 7 (contact surface 77). More specifically, the slit units 61 are in contact with the contact surface 77 of the reference plate 76 facing the light receiver 7. As in the retainer plate 64, the portion in which the slit units 61 and the reference plate 76 are in contact is not fixed with, for example, an adhesive. Thus, even when the slit units 61 are not in contact with the light emission surface 45 of the lens array 4 facing the light receiver 7, the slit units 61 can be positioned in the read depth direction with respect to the lens array 4 connected to the reference plate 76. The slit units 61 can thus be disposed temporarily on the lens array 4 in a more stable manner than with the retainer plate 64 alone as in Embodiment 6.

FIG. 38 is an enlarged view of the slit units 61 and the lens array 4 showing the surface with the reference plate 76 (a view of an example adhesive being applied). Similarly to the retainer plate 64, the reference plate 76 is not directly bonded to the reference protrusions 62 on each slit unit 61. Thus, in the same manner as for the surface of the slit units 61 and the lens array 4 with the retainer plate 64, the holder 42 in the lens array 4 is bonded to the reference protrusions 62 and the side plates 73 in the slit units 61. In this example, the reference protrusions 62 on the second side plates 73 and not in contact with the retainer plate 64 (the reference protrusions 62 in contact with the reference plate 76) are fixed, with the second adhesive 74, to the side surface of the holder 42 extending in the main scanning direction. More specifically, the surfaces of the reference protrusions 62 on the second side plates 73 and facing the side surface of the holder 42 are fixed to the side surface of the holder 42 with the second adhesive 74. The portion of the surface of the side plate 73 facing the lens array 4 without a reference protrusion 62 is fixed, with the second adhesive 74, to the side surface of the holder 42 extending in the main scanning direction. The first adhesive 72 may be used in at least one of portions fixed with the second adhesive 74 to shorten the curing time. As in Embodiment 6, the reference protrusions 62 on the second side plates 73 and not in contact with the retainer plate 64 (reference protrusions 62 in contact with the reference plate 76) may be fixed, with the first adhesive 72, to the side surface of the holder 42 extending in the main scanning direction. More specifically, the surfaces of the reference protrusions 62 on the second side plates 73 and facing the side surface of the holder 42 may be fixed to the side surface of the holder 42 with the first adhesive 72. In this example, the portion of the surface of the side plate 73 facing the lens array 4 without a reference protrusion 62 is fixed, with the second adhesive 74, to the side surface of the holder 42 extending in the main scanning direction.

The image reading device 700 according to Embodiment 7 can also reduce flares. The multiple slit units 61 are arranged in the main scanning direction such that each two adjacent slit units 61 are arranged with a space therebetween for one optical path of one lens 41. When a single slit unit extends across in the main scanning direction instead of the multiple slit units, tolerance accumulates and may cause a pitch difference between the light shielding plates 63 and the lenses 41. The light shielding plates 63 may thus be shifted inward over the lens 41 at the end. In such a case, the light shielding plates 63 may cause more stray light, and thus more flares. In contrast, multiple separate slit units can each accommodate the pitch difference and reduce the shifts of the light shielding plates 63 inward over the lenses. The separate slit units (light shields) also allow use of a smaller die for shaping the slit units. Additionally, the structure may have less collisions between the slit units resulting from linear expansion in the main scanning direction and in the read depth direction than in the structure with multiple slit units overlapping one another in the main scanning direction. This reduces tilting of the light shielding plates 63 resulting from collisions and stray light resulting from tilting of the light shielding plates 63, thus reducing flares.

The side plates 73 are eliminated from between each two adjacent slit units 61. Thus, any flare in the sub-scanning direction between one slit unit 61 and another slit unit 61 adjacent to the one slit unit 61 escapes toward the frame 1 and can be less visible during image capturing. Additionally, the slit units 61 with a shorter length facilitate manufacturing processes such as injection molding or stamping. The slit units 61 are not attached to the light emission surface 46 of the holder 42 facing the light receiver 7. Thus, the surface of the lens array 4 facing the light receiver 7 may not be ground into a flat surface. The slit units 61 reduce tilting of the light shielding plates 63 more than when being disposed on convex lenses. This structure can easily reduce deformation of the slit units 61.

The slit units 61 with uneven surfaces resulting from etching with an alkaline or acid solution can reduce reflection from the light shielding plates 63 and the side plates 73, thus reducing flares. The slit units 61 formed from a resin containing a granular filler by injection molding can thus be manufactured inexpensively.

Even when the slit units 61 are not in contact with the light emission surface 45 of the lens array 4 facing the light receiver 7, the slit units 61 can be positioned in the read depth direction with respect to the lens array 4 connected to the retainer plate 64. This structure does not use the first adhesive 72 applied throughout the entire length of the slit units 61 in the main scanning direction, and can thus reduce the likelihood of a change in the relative positional relationship of the rod lenses 41 in the lens array 4 and the light shielding plates 63 in the slit units 61 resulting from a linear expansion difference and detachment between the lens array 4 and the slit units 61. The first adhesive 72 can bond the lens array 4 and the slit units 61 together in a short time. Additionally, the second adhesive 74 with a low coefficient of thermal expansion can increase the bonding strength. The retainer plate 64 has the circular holes and the elliptic holes. Thus, the light shielding plates 63 in the slit units 61 can be easily attached parallel to the optical axis of the rod lenses 41 in the lens array 4, thus reducing flares. The structure also includes the reference plate 76. The slit units 61 can thus be disposed temporarily on the lens array 4 in a more stable manner than when with the retainer plate 64 alone.

REFERENCE SIGNS LIST

1 Frame
2 Transparent plate
3 Frame side plate
4 Lens array
41 Lens
42 Holder
43 Light incidence surface
44 Light incidence surface
45 Light emission surface
46 Light emission surface
47 Side surface
48 Side surface
5 Retainer plate
6 Slit unit
7 Light receiver
8 Sensor IC
9 Sensor substrate
10 Board support plate
11 Board
13 Adhesive
14 Light shielding plate
15 Side plate
16 Through-hole
17 First protrusion
18 Recess
19 Relief portion
20 Slit unit 21 Second protrusion
22 Groove
23 Slit unit
24 Second side plate
25 Slit unit
26 Connector
27 First member
28 Second member
49 Effective readable range
50 Lens array entire length
53 Lens
54 Lens
55 Slit mount end portion
56 Start-point light shielding plate
57 End-point light shielding plate
58 Lens-array end surface
59 Lens-array end surface
60 Light shield
100 Image reading device
200 Image reading device
300 Image reading device
400 Image reading device
500 Image reading device
600 Image reading device
700 Image reading device
61 Slit unit
62 Reference protrusion
63 Light shielding plate
64 Retainer plate
65 Contact surface
66 Tap
67 Fit hole
68 Fit long hole
72 First adhesive
73 Side plate
74 Second adhesive
76 Reference plate
77 Contact surface
78 Document
79 Light output value (smaller Ra)
80 Light output value (greater Ra)

The invention claimed is:

1. An image reading device comprising:
a lens array including a plurality of lenses arranged in a main scanning direction, the plurality of lenses forming an erect unmagnified optical system and configured to converge light from a reading target;
a holder extending in the main scanning direction and holding the lens array on two sides of the lens array in a direction intersecting the main scanning direction;
a light receiver to receive the light converged by the plurality of lenses; and
a plurality of slit units each including side plates and three or more light shielding plates, each of the three or more light shielding plates separating an optical path of one of the plurality of lenses from an optical path of another of the plurality of lenses between the lens array and the light receiver, the side plates being disposed on two sides of the three or more light shielding plates in the direction intersecting the main scanning direction and connecting the three or more light shielding plates by connecting adjacent light shielding plates, wherein
the plurality of slit units are arranged in the main scanning direction, and
each two adjacent slit units included in the plurality of the slit units are arranged with a space therebetween for one optical path of one lens included in the plurality of lenses.

2. The image reading device according to claim 1, wherein light shielding plates facing each other each included in a corresponding slit unit of the two adjacent slit units separates the one optical path of the one lens in the space between the two adjacent slit units from another optical path.

3. The image reading device according to claim 1, wherein each of the plurality of slit units has, on a surface thereof facing the light receiver, a recess recessed in a direction opposite to the light receiver.

4. The image reading device according to claim 1, wherein
a surface of the lens array facing the light receiver is flush with a surface of the holder facing the light receiver, and
the plurality of slit units are connected to the surface of the holder facing the light receiver.

5. The image reading device according to claim 1, wherein
each of the plurality of slit units includes a connector disposed on portions of surfaces of the three or more light shielding plates facing the lens array, and
the connector is connected to the holder.

6. The image reading device according to claim 5, wherein
the connector includes a first member and a second member,
the first member is connected to a surface of the holder facing the light receiver and to a side surface of the holder extending in the main scanning direction, and
the second member is connected to the surface of the holder facing the light receiver and to a side surface of the holder opposite to the side surface to which the first member is connected.

7. The image reading device according to claim 5, wherein the connector is formed from a same material as the holder.

8. The image reading device according to claim 1, wherein each of the plurality of slit units has a relief portion recessed on a surface thereof facing the lens array in a portion facing the lens array.

9. The image reading device according to claim 1, further comprising:
a retainer plate disposed on one of side surfaces of the holder extending in the main scanning direction, wherein
each of the plurality of slit units includes, on a surface of each of the side plates facing the lens array, reference protrusions protruding toward the lens array, and
each of the reference protrusions disposed on one of the side plates is in contact with, on a surface thereof opposite to the light receiver, a surface of the retainer plate facing the light receiver.

10. The image reading device according to claim 9, further comprising:
a reference plate disposed on one of the side surfaces of the holder extending in the main scanning direction that is opposite to the side surface on which the retainer plate is disposed, wherein
each of the reference protrusions disposed on another of the side plates is in contact with, on a surface thereof opposite to the light receiver, a surface of the reference plate facing the light receiver.

11. The image reading device according to claim 9, wherein at least one of the reference protrusions is fixed to one of the side surfaces of the holder extending in the main scanning direction with a first adhesive.

12. The image reading device according to claim 11, wherein each of the side plates is fixed to, on a portion without the reference protrusions on the surface thereof facing the lens array, the side surfaces of the holder extending in the main scanning direction with a second adhesive, the second adhesive having a longer curing time and a higher modulus of elasticity than the first adhesive.

13. The image reading device according to claim 9, wherein the retainer plate has, on a side surface thereof extending in the main scanning direction, a circular hole and an elliptic hole.

14. The image reading device according to claim 1, wherein each of the plurality of slit units includes, on a side surface of each of the side plates extending in the main scanning direction, a second protrusion protruding from the side plate in the direction intersecting the main scanning direction.

15. The image reading device according to claim 1, wherein each of the plurality of slit units includes, on a side surface of each of the side plates extending in the main scanning direction, a groove recessed in a direction from the lens array toward the light receiver.

16. The image reading device according to claim 1, wherein each of the plurality of slit units includes, on a side surface of each of the side plates on two sides extending in the main scanning direction, a second side plate having an end portion protruding from a surface of the slit unit facing the lens array, the end portion being connected to a surface of the holder facing the light receiver.

17. The image reading device according to claim 1, wherein the plurality of slit units are formed from a resin containing a granular filler.

18. The image reading device according to claim 1, wherein the plurality of slit units are formed from a resin containing a granular filler and a fibrous filler.

19. The image reading device according to claim 1, wherein the plurality of slit units have uneven surfaces formed by etching with an alkaline or acid solution.

20. The image reading device according to claim 1, wherein
a length of an array of the plurality of slit units arranged in the main scanning direction between a light shielding plate at a first end portion and a light shielding plate at a second end portion is shorter than a length of the lens array in the main scanning direction, and
the image reading device further comprises light shields, each of the light shields being disposed on a surface of the lens array facing the light receiver in a corresponding one of (i) a portion between one end of the lens array and the light shielding plate at the first end portion or (ii) a portion between another end of the lens array and the light shielding plate at the second end portion.

* * * * *